United States Patent
Seo et al.

(10) Patent No.: US 10,829,382 B2
(45) Date of Patent: Nov. 10, 2020

(54) ALUMINOSILICATE NANORODS

(71) Applicant: SKYSONG INNOVATIONS, Scottsdale, AZ (US)

(72) Inventors: Dong-Kyun Seo, Chandler, AZ (US); Lukas Sorge, Scottsdale, AZ (US); Shaojiang Chen, Mesa, AZ (US)

(73) Assignee: Skysong Innovations, Scottsdale, AZ (US)

( * ) Notice: Subject to any disclaimer, the term of this patent is extended or adjusted under 35 U.S.C. 154(b) by 0 days.

(21) Appl. No.: 16/479,387

(22) PCT Filed: Jan. 19, 2018

(86) PCT No.: PCT/US2018/014346
§ 371 (c)(1),
(2) Date: Jul. 19, 2019

(87) PCT Pub. No.: WO2018/136695
PCT Pub. Date: Jul. 26, 2018

(65) Prior Publication Data
US 2019/0382273 A1    Dec. 19, 2019

Related U.S. Application Data

(60) Provisional application No. 62/448,462, filed on Jan. 20, 2017.

(51) Int. Cl.
*C01B 39/02* (2006.01)
*C01B 39/46* (2006.01)

(52) U.S. Cl.
CPC .............. *C01B 39/02* (2013.01); *C01B 39/46* (2013.01); *C01B 39/026* (2013.01);
(Continued)

(58) Field of Classification Search
CPC ....... C01B 39/02; C01B 39/026; C01B 39/46; C01P 2004/16; C01P 2006/12
See application file for complete search history.

(56) References Cited

U.S. PATENT DOCUMENTS 3,558,273 A    1/1971  Beck
4,374,232 A    2/1983  Davis
(Continued)

FOREIGN PATENT DOCUMENTS

CN    102351213       2/2012
CN    106573847 A    4/2017
(Continued)

OTHER PUBLICATIONS

Sarkar et al, "ZnO—SiO2nanohybrid decorated sustainable geopolymer retaining anti-biodeterioration activity with improved durability",Materials Science & Engineering C, 92, (2018) 663-672 (Year: 2018).*
(Continued)

*Primary Examiner* — David M Brunsman
(74) *Attorney, Agent, or Firm* — Fish & Richardson P.C.

(57) ABSTRACT

Nanostructured aluminosilicates including aluminosilicate nanorods are formed by heating a geopolymer resin containing up to about 90 mol % water in a closed container at a temperature between about 70° C. and about 200° C. for a length of time up to about one week to yield a first material including the aluminosilicate nanorods. The aluminosilicate nanorods have an average width of between about 5 nm and about 30 or between about 5 nm and about 60 nm or between about 5 nm and about 100 nm, and a majority of the aluminosilicate nanorods have an aspect ratio between about 2 and about 100.

20 Claims, 38 Drawing Sheets

(52) U.S. Cl.
CPC ...... *C01P 2002/01* (2013.01); *C01P 2002/70* (2013.01); *C01P 2004/16* (2013.01); *C01P 2006/12* (2013.01)

(56) References Cited

U.S. PATENT DOCUMENTS

| | | | |
|---|---|---|---|
| 4,800,051 | A | 1/1989 | Yan |
| 4,923,830 | A | 5/1990 | Everhart et al. |
| 5,045,511 | A | 9/1991 | Bosomworth et al. |
| 5,167,942 | A | 12/1992 | Balkus |
| 5,244,726 | A | 9/1993 | Laney et al. |
| 5,320,843 | A | 6/1994 | Raheja et al. |
| 5,342,595 | A | 8/1994 | Davidovits et al. |
| 5,531,808 | A | 7/1996 | Ojo |
| 5,680,713 | A | 10/1997 | Fothert et al. |
| 5,725,836 | A | 3/1998 | Rouanet et al. |
| 5,788,950 | A | 8/1998 | Irnarnuma et al. |
| 6,131,305 | A | 10/2000 | Fothert et al. |
| 6,187,248 | B1 | 2/2001 | O'Neill et al. |
| 6,254,845 | B1 | 7/2001 | Ohashi et al. |
| 6,350,428 | B1 | 2/2002 | Verduijn |
| 6,617,276 | B1 | 9/2003 | Ballinger |
| 6,642,285 | B1 | 11/2003 | Bohner |
| 6,699,808 | B1 | 3/2004 | Schwertfeger et al. |
| 6,893,564 | B2 | 5/2005 | Mueller et al. |
| 7,014,881 | B2 | 3/2006 | Liu |
| 7,048,845 | B2 | 5/2006 | Bauer |
| 7,297,321 | B2 | 11/2007 | Shpeizer et al. |
| 7,456,123 | B2 | 11/2008 | Wachter |
| 7,771,686 | B2 | 8/2010 | Sagoe-crentsil et al. |
| 7,851,320 | B2 | 12/2010 | Chaumonnot et al. |
| 8,557,214 | B2 | 10/2013 | Seo |
| 8,563,020 | B2 | 10/2013 | Uhlmann et al. |
| 8,574,358 | B2 | 11/2013 | Biscan et al. |
| 9,242,900 | B2 | 1/2016 | Seo et al. |
| 9,296,654 | B2 | 3/2016 | Seo et al. |
| 9,308,511 | B2 | 4/2016 | Seo et al. |
| 9,365,691 | B2 | 6/2016 | Seo et al. |
| 9,738,621 | B2 | 8/2017 | Seo et al. |
| 9,862,644 | B2 | 1/2018 | Seo et al. |
| 1,017,075 | A1 | 1/2019 | Dong-Kyun Seo et al. |
| 2001/0023296 | A1 | 9/2001 | Kato et al. |
| 2002/0018747 | A1 | 2/2002 | Pinnavaia |
| 2003/0108785 | A1 | 6/2003 | Wu et al. |
| 2003/0168407 | A1 | 9/2003 | Kusakabe |
| 2004/0047798 | A1 | 3/2004 | Oh et al. |
| 2004/0093876 | A1 | 5/2004 | Inagaki |
| 2004/0258611 | A1 | 12/2004 | Barrow |
| 2005/0152829 | A1 | 7/2005 | Shpeizer et al. |
| 2005/0272593 | A1 | 12/2005 | Wachter |
| 2006/0057355 | A1 | 3/2006 | Suzuki et al. |
| 2006/0269472 | A1 | 11/2006 | Mackinnon |
| 2006/0292054 | A1 | 12/2006 | Chaumonnot et al. |
| 2007/0003749 | A1 | 1/2007 | Asgari |
| 2007/0009689 | A1 | 1/2007 | Murer |
| 2007/0048605 | A1 | 3/2007 | Pez et al. |
| 2007/0125271 | A1 | 6/2007 | Barlet-Gouedard et al. |
| 2007/0125272 | A1 | 6/2007 | Johnson |
| 2007/0128491 | A1 | 6/2007 | Chisholm et al. |
| 2007/0259979 | A1 | 11/2007 | Lee |
| 2008/0028994 | A1 | 2/2008 | Barlet-Gouedard et al. |
| 2008/0028995 | A1 | 2/2008 | Barlet-Gouedard et al. |
| 2008/0067149 | A1 | 3/2008 | Piesslinger-Schweiger et al. |
| 2008/0090716 | A1 | 4/2008 | Cherepy |
| 2008/0226893 | A1 | 9/2008 | Yang et al. |
| 2009/0026413 | A1 | 1/2009 | Patoux et al. |
| 2009/0041653 | A1 | 2/2009 | Hwang et al. |
| 2009/0256262 | A1 | 10/2009 | Farnworth et al. |
| 2009/0288557 | A1 | 11/2009 | Carati et al. |
| 2010/0104500 | A1 | 4/2010 | Holland |
| 2010/0222204 | A1 | 9/2010 | Frizon et al. |
| 2010/0254890 | A1 | 10/2010 | Yang |
| 2011/0073311 | A1 | 3/2011 | Porcherie et al. |
| 2011/0077176 | A1 | 3/2011 | Smith et al. |
| 2011/0092363 | A1 | 4/2011 | Seo et al. |
| 2012/0007020 | A1 | 1/2012 | Tarascon et al. |
| 2012/0227584 | A1 | 9/2012 | Wang |
| 2012/0235073 | A1 | 9/2012 | Seo et al. |
| 2012/0280171 | A1 | 11/2012 | Belharouak |
| 2013/0019780 | A1 | 1/2013 | Karimi et al. |
| 2013/0052126 | A1 | 2/2013 | Wang |
| 2013/0055924 | A1 | 3/2013 | Seo et al. |
| 2013/0071737 | A1 | 3/2013 | Belharouak et al. |
| 2013/0137010 | A1 | 5/2013 | Aitken et al. |
| 2013/0153830 | A1 | 6/2013 | Seo et al. |
| 2014/0342156 | A1 | 11/2014 | Seo et al. |
| 2015/0246819 | A1 | 9/2015 | Brichka et al. |
| 2016/0141616 | A1 | 5/2016 | Seo et al. |
| 2016/0168032 | A1 | 6/2016 | Seo |
| 2017/0137322 | A1 | 5/2017 | Seo |
| 2017/0173555 | A1 | 6/2017 | Seo et al. |
| 2019/0223445 | A1 | 7/2019 | Seo et al. |

FOREIGN PATENT DOCUMENTS

| | | |
|---|---|---|
| EP | 0013497 | 7/1980 |
| EP | 0138396 | 9/1984 |
| EP | 454239 | 10/1991 |
| EP | 0497966 | 8/1992 |
| EP | 497466 | 8/1995 |
| EP | 1230008 | 8/2002 |
| EP | 2758355 | 7/2014 |
| EP | 3154917 | 4/2017 |
| GB | 1601250 | 10/1981 |
| JP | 2003206112 | 7/2003 |
| KR | 10-2001-0082910 | 3/2001 |
| KR | 10-2001-0107049 | 12/2001 |
| KR | 20110063072 | 6/2011 |
| KR | 20110073443 | 6/2011 |
| RU | 2282587 C1 | 8/2006 |
| RU | 2503617 C2 | 1/2014 |
| WO | WO9721785 | 6/1997 |
| WO | WO99032218 | 7/1999 |
| WO | WO0128675 | 4/2001 |
| WO | WO2004018090 | 4/2004 |
| WO | 2004073021 A2 | 8/2004 |
| WO | WO2005019130 | 3/2005 |
| WO | WO2005054340 | 6/2005 |
| WO | WO2007064053 | 6/2007 |
| WO | WO2007129991 | 11/2007 |
| WO | WO2008124343 | 10/2008 |
| WO | WO2009050196 | 4/2009 |
| WO | WO2009140030 | 11/2009 |
| WO | WO2011046910 | 4/2011 |
| WO | WO2011068830 | 6/2011 |
| WO | WO2011109421 | 9/2011 |
| WO | WO2012018890 | 2/2012 |
| WO | WO2013044016 | 3/2013 |
| WO | 2013123308 A1 | 8/2013 |
| WO | WO2013163010 | 10/2013 |
| WO | WO2015006010 | 1/2015 |
| WO | WO2015191817 | 12/2015 |
| WO | WO2015191962 | 12/2015 |
| WO | WO2018013830 | 1/2018 |
| WO | WO2018136695 | 7/2018 |

OTHER PUBLICATIONS

EPO Communication pursuant to Rule 114(2) EPC in Application No. 12834535.2, dated Feb. 17, 2020, 6 pages.

Hasan et al., "Formation of LTA zeolite crystals with multi-hollow polycrystalline core-shell structure via aggregation-recrystallization route in presence of emulsion droplets," Microporous and Mesoporous Materials, 2012, 160:75-84.

Hasan et al., "Zeolite monoliths with hierarchical designed pore network structure: Synthesis and Performance," Supporting Information, Monash University, Department of Chemical Engineering, 9 pages.

Holleman and Wiberg, Lehrbuch der Anorganischen Chemie, 101st ed., de Gruyter (ed.), 1995, 926-927, 7 pages (Machine Translation).

Rompp Chemie Lexikon, "Pasten," Thieme Verlag (ed.), Mar. 2002, 2 pages (Machine Translation).

(56) References Cited

OTHER PUBLICATIONS

The New Shorter Oxford English Dictionary, "Sludge," Brown (ed.), 1993, 2:2905.
A Poulesquen et al., "Rheological behavior of alkali-activated metakaolin during geopolymerization", Journal of Non-Crystalline Solids 357 (2011) 3565-3571.
A. L. Myers et al., "Thermodynamics of Mixed-Gas Adsorption" A.I.Ch.E. Journal, vol. 11, No. 1, Jan. 1965, pp. 121-127.
A. S. Wagh, "Chemically Bonded Phosphate Ceramics—A Novel Class of Geopolymers," Ceramic Transactions 2005, vol. 165, 12 pages.
Aguado-Serrano et al., "Silica/C composites prepared by the sol-gel method. Influence of the synthesis parameters on textural characteristics", Microporous and Mesoporous Materials. 74, pp. 111-119 (2004).
Aguado-Serrano et al., "Surface and catalytic properties of acid metal—carbons prepared by the sol-gel method", Applied Surface Science. 252, pp. 6075-6079 (2006).
Akhtar, F. et al., "Colloidal processing and CO2 capture performance of sacrificially templated zeolite monoliths", Applied Energy, Jan. 13, 2012 (Online), vol. 97, pp. 289-296.
Baumann, Theodore F. et al., "Synthesis of High-Surface-Area Alumina Aerogels without the Use of Alkoxide Precursors", Chem. Mater., vol. 17, No. 2, pp. 395-401, 2005.
Bell et al. "Nano- and Microporosity in Geopolymer Gels" Microsc Microanal 12 (Supp 2), 2006, pp. 552-553.
Boettcher, Shannon W. et al., "Harnessing the Sol-Gel Process for the Assembly of Non-Silicate Mesostructured Oxide Materials", Accounts of Chemical Research, vol. 40, No. 9, pp. 784-792, 2007.
Boffa et al., "Preparation of templated mesoporous silica membranes on macroporous a-alumina supports via direct coating of thixotropic polymeric sols", Microporous and Mesoporous Materials. 100, pp. 173-182 (2007).
Bruno et al., "Characterization of monolithic porous carbon prepared from resorcinol/formaldehyde gels with cationic surfactant", Colloids and Surfaces A: Physicochemical and Engineering Aspects. 358, pp. 13-30 (2010).
C Montes et al., "Statistical software to improve the accuracy of geopolymer concrete mix design and proportioning", 2013 World of Coal Ash (WOCA) Conference—Apr. 22-25, 2013 in Lexington, KY, 9 pages.
C. H. Christensen et al., "Mesoporous zeolite single crystal catalysts: Diffusion and catalysis in hierarchical zeolites" Catalysis Today 128, 2007, pp. 117-122.
Cao and Limmer, "Oxide Nanowires and Nanorods," Encyclopedia of Nanoscience and Nanotechnology Edited by H. S. Nalwa vol. 8, p. 377-396.
Capadona et al., "A versatile approach for the processing of polymer nanocomposites with selfassembled nanofibre templates", Nature Nanotechnology. 2, pp. 765-769 (2007).
Capadona et al., "X-Aerogel Processing Time Reduced by One-Pot Synthesis" http://www.grc.nasa.gov/www/rt/2006/rx/rx20p-capadonal html, retrieved on Jul. 26, 2013 (last updated Dec. 14, 2007), 4 pages.
D Medpelli, "New Nanostructured Aluminosilicates from Geopolymer Chemistry", PhD Thesis, Arizona State University, Tempe, Arizona, May 2015, 192 pages.
D. P. Serrano et al., "Synthesis strategies in the search for hierarchical zeolites" Chemical Society Reviews 42, 2013, pp. 4004-4035.
Duxson et al. "Geopolymer technology: the current state of the art" J Mater Sci (2007) 42:2917-2933.
Fatin Hasan et al. "Direct synthesis of hierarchical LTA zeolite via a low crystallization and growth rate technique in presence of cetyltrimethylammonium bromide," Journal of Colloid and Interface Science 382 (2012) 1-12.
Gresham, Dr. Robert M., contributing editor, "Viscosity: A fluid's resistance to flow," Tribology & Lubrication Technology, Nov. 2008, pp. 55-57.

Han et al., "The effect of silica template structure on the pore structure of mesoporous carbons", School of Chemical Engineering, Seoul National University, Carbon. 41, pp. 1049-1056 (2003).
Hasan, F. A. et al., "Zeolite monoliths with hierarchical designed pore network structure: Synthesis and performance," Chemical Engineering Journal, Mar. 7, 2013 (Online), vol. 223, pp. 48-58.
Iancu, Nora et al.,"Low-temperature synthetic method for size-controlled CdSe nanocrystals: utilization of boron selenide", Chem. Commun. 20, pp. 2298-2299, 2004.
J. Aleman et al., "Definitions of Terms Relating to the Structure and Processing of Sols, Gels, Networks, and Inorganic—Organic Hybrid Materials," Pure and Applied Chemistry, vol. 79, No. 1, 2007, pp. 1801-1829.
Joseph Davidovits, "Geopolymer Chemistry and Applications" Jun. 2008, Chapter 1, 16 pages.
Joseph Davidovits, Geopolymer Chemistry and Applications, 3rd Edition, Jul. 2011, pp. 1-33.
Ju Dong-Ying et al., "Low-temperature sintering method for NiCuZn ferrite and effects of Mn addition on electromagnetic properties", Transactions of Nonferrous Metals Society of China, vol. 16, Supplement 1, pp. s67-s70, Jun. 2006.
K De Weerdte, "Geopolymers —State of the art", COIN Project report no 37, 2011, 39 pages.
K Shotri, Dynamic Mechanical Properties of Geopolymer-Polymer Composites, MSc thesis, Center for Materials Science and Engineering, Rochester Institute of Technology, New York, 2006, 86 pages.
Komnitsas et al. "Geopolymerisation: A review and prospects for the minerals industry" Minerals Engineering 20 (2007), pp. 1261-1277.
Kriven et al., "Microstructure and nanoporosity of as-set geopolymers" Ceramic Engineering and Science Proceedings 2007, vol. 27, Issue 2, pp. 491-503.
Kübel, Christian et al., "Recent Advances in Electron Tomography: TEM and HAADF-STEM Tomography for Materials Science and Semiconductor Applications", Microscopy and Microanalysis, vol. 11, pp. 378-400, 2005.
Kwak, Ja Hun et al., "Penta-coordinated Al3+ ions as preferential nucleation sites for BaO on γ Al2O3: An ultra-highmagnetic field 27Al MAS NMR study", Journal of Catalysis, vol. 251, pp. 189-194, 2007.
L. Gueudré et al, "Diffusion in zeolites: is surface resistance a critical parameter?" Adsorption 16, 2010, pp. 17-27.
Laine et al. "Making Nanosized Oxide Powders From Precursors by Flame Spray Pyrolysis". Key Engr Matl. 159-160 pp. 17-24. 1999.
Lee et al., "Recent Progress in the Synthesis of Porous Carbon Materials" Advanced Materials (Weinheim, Germany) (2006), 18(16), pp. 2073-2094.
Le-Ping L et al, "Preparation phosphoric acid-based porous geopolymers," Applied Clay Science, vol. 50, No. 4, Dec. 1, 2010, pp. 600-603.
Leventis et al., "One-Pot Synthesis of Interpenetrating Inorganic/Organic Networks of CuO/Resorcinol—Formaldehyde Aerogels: Nanostructured Energetic Materials", J. Am. Chem. Soc. 131, pp. 4576-4577 (2009).
Liong, M. et al., "Antimicrobial activity of silver nanocrystals encapsulated in mesoporous silica nanoparticles", Advanced Materials, 2009, vol. 21, pp. 1684-1689.
M Romagnoli et al., "Rheology of geopolymer by DOE approach", Construction and Building Materials 36 (2012) 251-258.
Michels. H. T. et al., "Effects of temperature and humidity on the efficacy of methicillin-resistant *Staphylococcus aureus* challenged antimicrobial materials containing silver and copper", Letters in Applied Microbiology, 2009, vol. 49, pp. 191-195.
Moreno-Castilla et al., "Synthesis and surface characteristics of silica- and alumina-carbon composite xerogels", Phys. Chem. Chem. Phys. 2, pp. 4818-4822 (2000).
Morris et al., "Silica Sol as a Nanoglue: Flexible Synthesis of Composite Aerogels" Science (Washington, D.C.) 1999, 284, (5414), pp. 622-624.
Mulik, Sudhir et al., "Time-Efficient Acid-Catalyzed Synthesis of Resorcinol-Formaldehyde Aerogels", Chem. Mater., vol. 19, No. 25, pp. 6138-6144, 2007.

(56) References Cited

OTHER PUBLICATIONS

N.-L. Michels et al., "Hierarchically Structured Zeolite Bodies: Assembling Micro-, Meso-, and Macroporosity Levels in Complex Materials with Enhanced Properties" Adv. Funct. Mater. 22, 2012, pp. 2509-2518.

Nedelec, J.M., "Sol-Gel Processing of Nanostructured Inorganic Scintillating Materials", Journal of Nanomaterials, vol. 2007, Article ID 36392, 8 pages, 2007.

O. Cheung et al., "Adsorption kinetics for $CO_2$ on highly selective zeolites NaKA and nano-NaKA" Applied Energy 112, 2013, pp. 1326-1336.

O. Cheung et al., "Silicoaluminophosphates as $CO_2$ sorbents" Microporous Mesoporous Materials 156, 2012, pp. 90-96.

International Search Report and Written Opinion of International Application No. PCT/US2018/014346 dated Jun. 22, 2018, 15 pages.

Pek et al., "A thixotropic nancomposite gel for three-dimensional cell culture" Nature Nanotechnology (2008), 3(11), pp. 671-675.

Phr Borges et al., "Andreasen Particle Packing Method on the Development of Geopolymer Concrete for Civil Engineering", J. Mater. Civ. Eng. 26 (2014) 692-697.

Provis et al. "Do Geopolymers Actually Contain Nanocrystalline Zeolites? A Reexamination of Existing Results" Chem. Mater. 17, 2005, pp. 3075-3085.

Richards, Ryan et al., "Consolidation of Metal Oxide Nanocrystals. Reactive Pellets with Controllable Pore Structure That Represent a New Family of Porous, Inorganic Materials", Journal of American Chemical Society, vol. 122, No. 20, pp. 4921-4925, 2000.

Robert L. Burwell, Jr. "Manual of Symbols and Terminology for Physicochemical Quantities and Units—Appendix II. Definitions, Terminology and Symbols in Colloid and Surface Chemistry. Part II: Heterogeneous Catalysis," Pure and Applied Chemistry, vol. 46, 1976, pp. 71-90.

Rolison, D. R. et al., "Electrically conductive oxide aerogels: new materials in electrochemistry", Journal of Materials Chemistry, vol. 11, pp. 963-980, 2001.

Schuyten et al. "A Novel Combustion Synthesis Preparation of $CuO/ZnO/ZrO_2/Pd$ for Oxidative Hydrogen Production from Methanol" Catal Lett (2008) 121:189-198.

Sivashanmugam, A. et al., "Glycine-Assisted Sol-Gel Combustion Synthesis and Characterization of Aluminum-Doped $LiNiVO_4$ for Use in Lithium-Ion Batteries", Journal of the Electrochemical Society, vol. 153, No. 3, A497-A503, 2006.

T. Mahata, G Das, R.K. Mishra, B.P. Sharma, Combustion synthesis of gadolinia doped ceria powder, Journal of Alloys and Compounds, vol. 391, Issues 1-2, Apr. 5, 2005, pp. 129-135.

Thomas et al. "Amorphous Zeolites" Angew. Chem. Inr. Ed. Engl. 19 (1980) No. 9, pp. 745-746.

Villemin, Didier et al., "A one step process for grafting organic pendants on alumina via the reaction of alumina and phosphonate under microwave irradiation", Chem. Commun. 2001, pp. 2060-2061, 2001.

W. M. Kriven, "Inorganic Polysialates or 'Geopolymers'" American Ceramic Society Bulletin, May 2010, vol. 89, No. 4, pp. 31-34.

Zhang et al., "Mesostructured Forms of $\gamma$-$Al_2O_3$", J. Am. Chem. Soc. 124, pp. 1592-1593 (2002).

Zhang, J. et al., "Synthesis of a self-supporting faujasite zeolite membrane using geopolymer gel for separation of alcohol/water mixture," Materials Letters, Nov. 9, 2013 (Online), vol. 116, pp. 167-170.

Zürner, Andreas et al., "Visualizing single-molecule diffusion in mesoporous materials", Nature, vol. 450, pp. 705-709, Nov. 29, 2007.

\* cited by examiner

ALUMINOSILICATE NANORODS

CROSS-REFERENCE TO RELATED APPLICATION

This application is a U.S. National Stage Application under 35 USC § 371 and claims the benefit of International Patent Application No. PCT/US2018/014346 entitled "ALUMINOSILICATE NANORODS" and filed on Jan. 19, 2018, which claims the benefit of U.S. patent application Ser. No. 62/448,462 entitled "ALUMINOSILICATE NANORODS" and filed on Jan. 20, 2017, both of which are incorporated herein by reference in their entirety.

TECHNICAL FIELD

This invention relates to nanostructured aluminosilicates including aluminosilicate nanorods, as well as materials that include the nanostructured aluminosilicates, the aluminosilicate nanorods, and materials that contain the aluminosilicate nanorods, aggregates thereof, or both.

BACKGROUND

Nanorods are a type of one-dimensional nanostructured materials. Nanorods are nanostructures shaped like sticks or dowels with a nanoscale diameter and a length that exceeds the diameter. Nanorods are alternatively called elongated nanoparticles, acicular particles, high aspect ratio particles, and nanowhiskers. Nanorods are suitable for a broad range of applications including sensors and composites.

Alkali-activated aluminosilicates are a type of geopolymer. Geopolymers are also commonly referred to by a variety of terms, including low-temperature aluminosilicate glass, alkali-activated cement, geocement, alkali-bonded ceramic, inorganic polymer concrete, and hydroceramic. Geopolymers are prepared by curing geopolymer resins. In some cases, geopolymer resins are prepared by coupled alkali-mediated dissolution and precipitation reactions of silicate or aluminosilicate precursors in an aqueous media. Geopolymers are nanomaterials that exhibit a dense gel-like structure with 5 nm- to 60 nm-sized "isotropic" amorphous aluminosilicate particles. Their chemical structure typically includes an amorphous, three-dimensional network of corner-sharing aluminate and silicate tetrahedra, with the negative charge due to $Al^{3+}$ ions in the tetrahedral sites balanced typically by the alkali metal ions.

SUMMARY

In a first general aspect, a nanostructured aluminosilicate includes aluminosilicate nanorods. The aluminosilicate nanorods have an average width between about 5 nm and about 100 nm, and a majority of the aluminosilicate nanorods have an aspect ratio between about 2 and about 100.

In a second general aspect, an aqueous medium, organic medium, colloidal medium, latex colloidal medium, dispersion medium, suspension medium, polymeric medium, or elastomeric medium includes the nanostructured aluminosilicates or modified nanostructured aluminosilicates of the first general aspect.

In a third general aspect, an article includes the nanostructured aluminosilicates or modified nanostructured aluminosilicates of the first general aspect.

In a fourth general aspect, a material includes the nanostructured aluminosilicates or modified nanostructured aluminosilicates of the first general aspect.

In a fifth general aspect, forming aluminosilicate nanorods includes heating a geopolymer resin containing up to about 90 mol % water (e.g., between about 70 mol % and about 90 mol %) in a closed container at a temperature between about 70° C. and about 200° C. for a length of time up to about one week to yield a first material including nanostructured aluminosilicates. The nanostructured aluminosilicates include aluminosilicate nanorods.

Implementations of the first through fifth general aspects may include one or more of the following features.

In some cases, the aluminosilicate nanorods have an average width between about 5 nm and about 60 nm, or between about 5 nm and about 30 nm. In certain cases, at least 50% of the aluminosilicate nanorods have an aspect ratio of at least 2, at least 3, at least 4, at least 5, or at least 10. In certain cases, a majority of the aluminosilicate nanorods are not chemically or covalently bonded to another one of the aluminosilicate nanorods.

The mesopore volume of the nanostructured aluminosilicates may be at least about 0.05 cc/g, at least about 0.1 cc/g, at least about 0.2 cc/g, or at least about 0.3 cc/g on the Barrett-Joyner-Halenda (BJH) cumulative pore volume from the desorption branch of the $N_2$ sorption isotherm, where the mesopore volume is the total pore volume of the pores having a pore width between about 2 nm and about 50 nm.

In some implementations, the aluminosilicate nanorods have a majority of aluminum and silicon atoms in a tetrahedral coordination environment. The aluminosilicate nanorods may have a crystallinity with a CAN-type framework structure. In some cases, the aluminosilicate nanorods include a zeolite containing anions in the zeolite cages.

The specific external surface area of the nanostructured aluminosilicates may be between 50 $m^2/g$ and 400 $m^2/g$. As used herein, "specific external surface area" generally refers to the total specific surface area minus the specific micropore surface area. In some cases, the specific micropore surface area of the nanostructured aluminosilicates is between 1 $m^2/g$ and 60 $m^2/g$ or between 60 $m^2/g$ and 700 $m^2/g$.

In some implementations, the aluminosilicate nanorods are formed in a geopolymerization process. In one example, a geopolymerization process includes providing a geopolymer resin containing up to about 90 mol % water (e.g., between about 70 mol % and about 90 mol %), optionally keeping the geopolymer resin at a temperature up to about 60° C. for up to about a week, and heating the geopolymer resin in a closed container at a temperature between about 70° C. and about 200° C. for up to about a week to yield a first material including the nanostructured aluminosilicates. In some cases, the process includes treating first material to produce a second material. In some cases, the process includes concentrating a solid component or collecting a solid product from the first or second material, where the solid component or solid product includes nanostructured aluminosilicates, and the nanostructured aluminosilicates include aluminosilicate nanorods or modified nanostructured aluminosilicates comprising modified aluminosilicate nanorods.

In some cases, treating the first material may include reducing the concentration of hydroxide of the first material to about 1 M or reducing the pH of the first material from about 14. In certain cases, treating the first material includes diluting the first material or mixing the first material with an acidic solution. In certain cases, treating the first material includes combining the first material with a solution of a metal ion that forms an oxide, hydroxide, hydrous oxide, or combination thereof in contact with hydroxide ions.

In some implementations, the absolute value of the zeta potential of the nanostructured aluminosilicates or the modified nanostructured aluminosilicates is at least about 30 mV, at least about 40 mV, at least about 50 mV, or at least about 60 mV in a pH range between about 3 and about 14, between about 3 and about 13, between about 3 and about 12, between about 4 and about 14, between about 4 and about 13, between about 4 and about 12, between about 5 and about 14, between about 5 and about 13, or between about 5 and about 12.

In some cases, a surface of the aluminosilicate nanorods is covered partially or completely with one or more organic molecules, surfactants, or polymers or a combination thereof. In some cases, a surface of the aluminosilicate nanorods is covered partially or completely with inorganic molecules or nanoparticles. In some cases, a surface of the aluminosilicate nanorods is covered partially or completely with molecules of a biological origin. In some cases, the alkali ions in the aluminosilicate nanorods are exchanged partially or completely with other metal ions or protons.

In some implementations of the second general aspect, the nanostructured aluminosilicates or modified nanostructured aluminosilicates provide a thixotropic property to the aqueous medium, organic medium, suspension medium, polymeric medium, or elastomeric medium of the second general aspect.

In some implementations of the third general aspect, the article is a tire, a rubber belt, a rubber seal, a rubber tube, footwear, a polystyrene foam, a polyurethane foam, a plastic, a fire extinguisher, a tooth paste, a drug tablet, a membrane, a dehumidifier, fertilizer or a heat exchanger.

In some implementations of the fourth general aspect, the material is an adhesive, a sealant, a colorant, an ink, an ink for ink-jet printers, a toner, a paint, a coating, a defoamer, a grease, a paper, a cement, a thermal insulating material, a sound proofing material, a rubber, a silicone rubber, a plastic, an animal feed, an animal nutrient, an antibiotic, an antimicrobial agent, a fertilizer, a pesticide, a gel, an antacid, a food item, a fire retardant, a cosmetic, a cream, a lotion, a sealing agent, an adsorbent, a gas adsorbent, a carbon dioxide adsorbent or separator, a gas purifier, a deodorant, a detergent, a cat litter, a catalyst, an oxygen concentrator, an ion exchanger, a sulfur scavenger, an acid scavenger, a radionuclide sorbent, or a desiccant. In certain implementations of the fourth general aspect, the material is in the form of a liquid, a semi-liquid, a paste, a semi-solid, powder, granules, beads, pellets, film, coating, fibers, hollow fibers, wires, strings, tubing, foams, or monoliths.

Implementations of the fifth general aspect may include one or more of the following features.

In one implementation, the fifth general aspect includes heating the geopolymer resin at a temperature up to about 60° C. for a length of time up to about one week before heating the geopolymer resin at the temperature between about 70° C. and about 200° C. for the length of time up to about one week. The first material may be treated to yield a second material. In some cases, a solid product from the first or second material is collected. Collecting the solid product from the first or second material may include removing water partially or completely from the first or second material.

The details of one or more implementations of the subject matter described in this specification are set forth in the accompanying drawings and the description below. Other features, aspects, and advantages of the subject matter will become apparent from the description, the drawings, and the claims.

DETAILED DESCRIPTION

Figure 1:
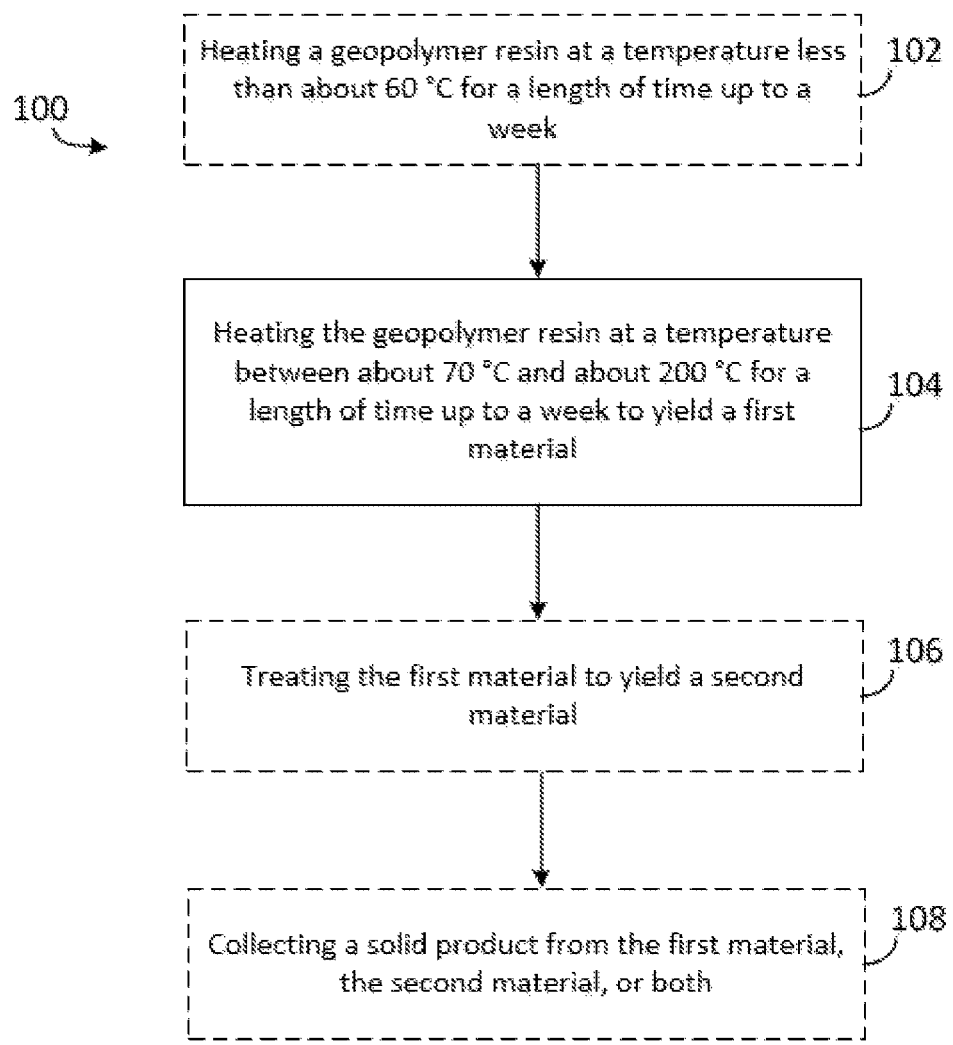
FIG. 1 is a flowchart showing a process for forming geopolymeric aluminosilicate particles.

A process for synthesizing aluminosilicate nanorods from a geopolymer resin is described. As used herein, "aluminosilicate" generally refers to a composition of matter including aluminium, silicon, and oxygen, plus countercations. Typical counterions include sodium, potassium, cesium, barium, and calcium. As used herein, "nanorod" generally refers to a solid or porous nanostructure having a generally cylindrical shape, with its diameter (width) in a range between about 1 nm and about 100 nm. As used herein, a geopolymer resin typically includes water and dissolved, dispersed, or suspended inorganic species (e.g., selected metal precursors), and may appear to be homogeneous upon visual inspection. Geopolymer resins can be prepared in various ways. In one example, geopolymer resins are prepared by coupled alkali-mediated dissolution and precipitation reactions of silicate or aluminosilicate precursors in an aqueous media. Geopolymer resins can be formed by reacting a clay material with an alkaline or acidic solution. In some examples, metakaolin and metakaolinite are reacted with an alkaline solution to form a geopolymer resin. Geopolymer resins are described in U.S. Pat. No. 9,242,900 which is incorporated herein by reference in its entirety.

Synthesizing aluminosilicate nanorods from a geopolymer resin includes a geopolymerization process in which a geopolymer is formed from a geopolymer resin by curing the geopolymer resin. In some embodiments, synthesizing aluminosilicate nanorods from a geopolymer resin includes heating a geopolymer resin including water from about 70 mol % to about 90 mol % in a closed container at a temperature between about 70° C. and about 200° C. for a length of time from about 30 minutes up to about one week to yield a nanostructured aluminosilicate comprising aluminosilicate nanorods. The water mol % is estimated from the molar amounts ("mole#") of the elements of alkali metals ("A"), alkaline earth metals ("AE"), aluminum and silicon in their corresponding anhydrous oxide forms ($A_2O$, AEO, $Al_2O_3$ and $SiO_2$, respectively) and the mole# of water in the geopolymer resin, using the following formula:

$$\text{water mol \%} = \frac{100 \times \text{mole \#(water)}}{2 \times \text{mole \#}(A_2O) + \text{mole \#(AEO)} + 2 \times \text{mole \#}(Al_2O_3) + \text{mole \#}(SiO_2) + \text{mole \#(water)}}.$$

The closed container prevents any significant loss of water from the geopolymer resin during heating. An average width of the aluminosilicate nanorods formed via the described process is between about 5 nm and about 100 nm, between about 5 nm and about 60 nm, or between about 5 nm and about 30 nm. In some embodiments, a majority (e.g., over 50%, over 60%, over 70%, over 80%, over 90%, over 95%, or over 99%) of the nanorods have an aspect ratio in a range between about 2 and about 100. As used herein, an "aspect ratio" of a nanorod refers to a length of the nanorod divided by a width of the nanorod. In some embodiments, a majority of the aluminosilicate nanorods have an aspect ratio of at least 2, at least 3, at least 4, at least 5, or at least 10. In some embodiments, a majority of the aluminosilicate nanorods are unbound. As used herein, "unbound" aluminosilicate nanorods are not chemically or covalently bonded to one or more other aluminosilicate nanorods.

In some embodiments, a majority of aluminum and silicon atoms in the aluminosilicate nanorods are in a tetrahedral coordination environment. In some embodiments, the aluminosilicate nanorods are microporous. In certain embodiments, the specific micropore surface area of the nanostructured aluminosilicates, which is usually estimated from t-plot obtained from gas sorption analysis, is between about 1 $m^2/g$ and about 60 $m^2/g$ or between about 60 $m^2/g$ and about 700 $m^2/g$. In some embodiments, the aluminosilicate nanorods comprise a zeolite. In some embodiments, the aluminosilicate nanorods comprise a zeolite having crystallinity with a cancrinite (CAN)-type framework structure. As used herein, "zeolite" generally refers to minerals including hydrated aluminosilicates of sodium, potassium, cesium, calcium, and barium. In certain embodiments, the zeolite contains an anion in the zeolite cage.

In some embodiments, the nanostructured aluminosilicate includes unbound aluminosilicate nanorods. In some embodiments, the nanostructured aluminosilicate includes aggregates of aluminosilicate nanorods. In some embodiments, the nanostructured aluminosilicate includes an agglomerate of aluminosilicate nanorods. In some embodiments, the nanostructured aluminosilicate includes an aggregate and an agglomerate of aluminosilicate nanorods. In some embodiments, the specific external surface area of the nanostructured aluminosilicates is between about 50 $m^2/g$ and about 400 $m^2/g$. As used herein, "specific external surface area" refers to the total specific surface area, or total surface area per unit of mass, minus the specific micropore surface area.

In some embodiments, the nanostructured aluminosilicates exhibit mesopores, with pore sizes in a range between about 2 nm and about 50 nm. In certain embodiments, a mesopore volume of the nanostructured aluminosilicates is at least about 0.05 cc/g, at least about 0.1 cc/g, at least about 0.2 cc/g, or at least about 0.3 cc/g on the Barrett-Joyner-Halenda (BJH) cumulative pore volume from the desorption branch of the $N_2$ sorption isotherm, where the mesopore volume is the total pore volume of the pores having a pore diameter between about 2 nm and about 50 nm.

The absolute value of the zeta potential of the nanostructured aluminosilicates is at least about 30 mV, at least about 40 mV, at least about 50 mV, or at least about 60 mV in a pH range between about 3 and about 14, between about 3 and about 13, between about 3 and about 12, between about 4 and about 14, between about 4 and about 13, between about 4 and about 12, between about 5 and about 14, between about 5 and about 13, or between about 5 and about 12.

FIG. 1 depicts a flow chart of process 100 for synthesizing aluminosilicate nanorods from a geopolymer resin including water from about 70 mol % to about 90 mol % including optional operations 102, 106, and 108. In 102, a geopolymer resin is optionally heated at a temperature from about 25° C. to less than about 60° C. for a length of time from 30 minutes up to about one week. In 104, the geopolymer resin is heated in a closed container at a temperature between about 70° C. and about 200° C. for a length of time from about 30 minutes up to about one week to yield a first material. In some embodiments, the first material is a semisolid, a semiliquid, or a paste. The first material includes nanostructured aluminosilicate. In some embodiments, the nanostructured aluminosilicate includes unbound aluminosilicate nanorods. In some embodiments, the nanostructured aluminosilicate includes an aggregate of aluminosilicate nanorods. In some embodiments, the nanostructured aluminosilicate includes an agglomerate of aluminosilicate nanorods. In some embodiments, the nanostructured aluminosilicate includes an aggregate and an agglomerate of aluminosilicate nanorods. In some embodiments, the nanostructured aluminosilicate includes an agglomerate of aggregates of aluminosilicate nanorods.

In 106, the first material from 104 is optionally treated to yield a second material. In some embodiments, the second material is a semisolid, a semiliquid, a paste, or a dispersion. In some embodiments, the second material includes nanostructured aluminosilicates or modified nanostructured aluminosilicates. In some embodiments, the nanostructured aluminosilicates or modified nanostructured aluminosilicates include unbound aluminosilicate nanorods or unbound modified aluminosilicate nanorods. In some embodiments, the nanostructured aluminosilicates or modified nanostructured aluminosilicates include an aggregate of aluminosilicate nanorods or modified aluminosilicate nanorods. In some embodiments, the nanostructured aluminosilicate or modified nanostructured aluminosilicates include an agglomerate of aluminosilicate nanorods or modified aluminosilicate nanorods. In some embodiments, the nanostructured aluminosilicate or modified nanostructured aluminosilicates includes an aggregate and an agglomerate of aluminosilicate nanorods or modified aluminosilicate nanorods. In some embodiments, the nanostructured aluminosilicate or modified nanostructured aluminosilicate includes an agglomerate of aggregates of aluminosilicate nanorods or modified aluminosilicate nanorods. In some embodiments, modified nanostructured aluminosilicates or modified aluminosilicate nanorods are obtained when treating the first material. In some embodiments, treating the first material includes reducing the concentration of hydroxide of the first material to about 1 M. In some embodiments, treating the first material includes reducing the pH of the first material from about 14. In certain embodiments, treating the first material includes diluting the first material with water or combining the first material with an acidic solution comprising mineral acid, sulfuric acid, hydrochloric acid, nitric acid, organic acid or a combination thereof. In other embodiments, treating the first material includes combining the first material with a solution of a metal ion that forms an oxide, hydroxide, hydrous oxide, or combination thereof in contact with hydroxide ions. In some embodiments, the metal ion is a main group metal (e.g., antimony), a transition metal (e.g., silver, zinc, copper, iron, molybdenum), a lanthanide metal (e.g., cerium), or a combination thereof.

In 108, a solid product is optionally collected from the first material, the second material, or both. The solid products include the nanostructured aluminosilicates comprising aluminosilicate nanorods or modified aluminosilicate nanorods. In some embodiments, collecting the solid product includes removing water partially or completely from the first or second material to concentrate the solid product. In some embodiments, collecting the solid product is aided by addition of a flocculant or a surfactant.

In some embodiments, process 100 includes only operation 104. In other embodiments, process 100 includes one or more of optional operations 102, 106, and 108. In still other embodiments, process 100 includes one or more additional operations in addition to operation 104, together with or in the absence of one or more of optional operations 102, 106, and 108.

In some embodiments, process 100 yields modified aluminosilicate nanorods, in which a surface of the aluminosilicate nanorods is at least partially covered with one or more organic molecules such as organic dyes and urea, carboxylic acids such as stearic acid, surfactants such as quaternary ammonium and quaternary phosphonium, or polymers such as polyethylene glycol, elastic polymers and PVC or a combination thereof. In some embodiments, process 100 yields modified aluminosilicate nanorods in which a surface of the aluminosilicate nanorods is at least partially covered with inorganic molecules such as silanes and ferrocene or nanoparticles such as zinc oxide, copper oxide, titanium oxide, and cerium oxide. In certain embodiments, process 100 yields modified aluminosilicate nanorods in which a surface of the aluminosilicate nanorods is at least partially covered with molecules of a biological origin such as proteins, DNAs, RNAs, and biogenic polymers. In other embodiments, alkali ions in the aluminosilicate nanorods are at least partially exchanged with protons or other metal ions such as silver, zinc, copper, alkaline earth metals, transition metals, and lanthanide metals.

In some embodiments, the nanostructured aluminosilicate, the modified nanostructured aluminosilicate, the aluminosilicate nanorods or the modified aluminosilicate nanorods are combined with an aqueous medium, an organic medium, a colloidal medium, a latex colloidal medium, a dispersion medium, a suspension medium, a polymeric medium, or an elastomeric medium, and provides a thixotropic property to the selected medium.

Articles, such as tires, rubber belts, rubber seals, rubber tubes, footwear, polystyrene foams, polyurethane foams, plastics, fire extinguishers, tooth pastes, drug tablets, membranes, dehumidifiers, fertilizers, or heat exchangers may be fabricated to include the nanostructured aluminosilicate, the modified nanostructured aluminosilicate, the aluminosilicate nanorods or the modified aluminosilicate nanorods. In comparison to isotropic particles, nanorods can provide a lower viscosity mixture, easy mixing of the components and/or provide an anisotropic physical property to the composite in which the nanorods are incorporated. In some embodiments, the nanostructured aluminosilicate, the modified nanostructured aluminosilicate, the aluminosilicate nanorods or the modified aluminosilicate nanorods are included in materials such as adhesives, sealants, colorants, inks (including inks for ink-jet printers), toners, paints, coatings, defoamers, greases, papers, cements, thermal insulating materials, sound proofing materials, rubbers (such as silicone rubbers), plastics, animal feeds, animal nutrients, antibacterial agents, antimicrobial agents, fertilizers, pesticides, gels, antacids, food items, fire retardants, cosmetics, creams, lotions, sealing agents, adsorbents (such as gas adsorbents), carbon dioxide adsorbents or separators, gas purifiers, deodorants, detergents, cat litters, catalysts, oxygen concentrators, ion exchangers, sulfur scavengers, acid scavengers, radionuclide sorbents, or desiccants. These materials may be liquids, semiliquids, pastes, semisolids, powders, granules, beads, pellets, films, coatings, fibers, hollow fibers, wires, strings, tubing, foams, or monoliths.

EXAMPLES

Example 1

Figure 2:
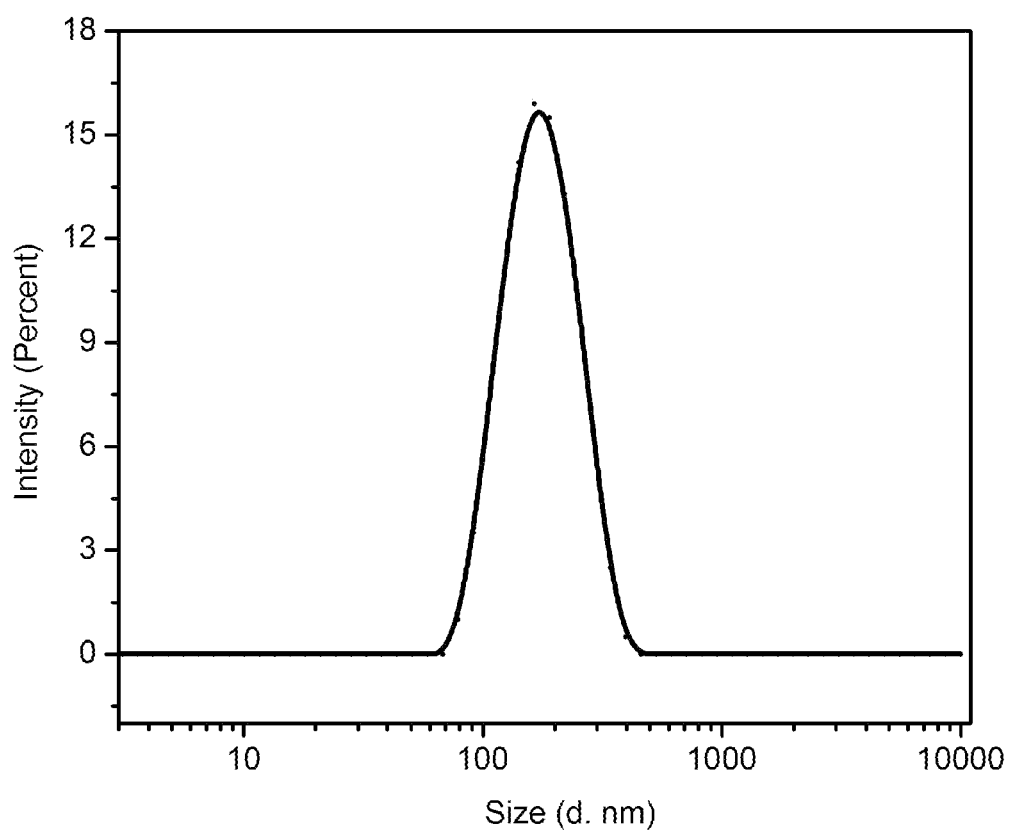
FIG. 2 shows the dynamic light scattering particle size distribution of the wet product in Example 1.
Figure 3:
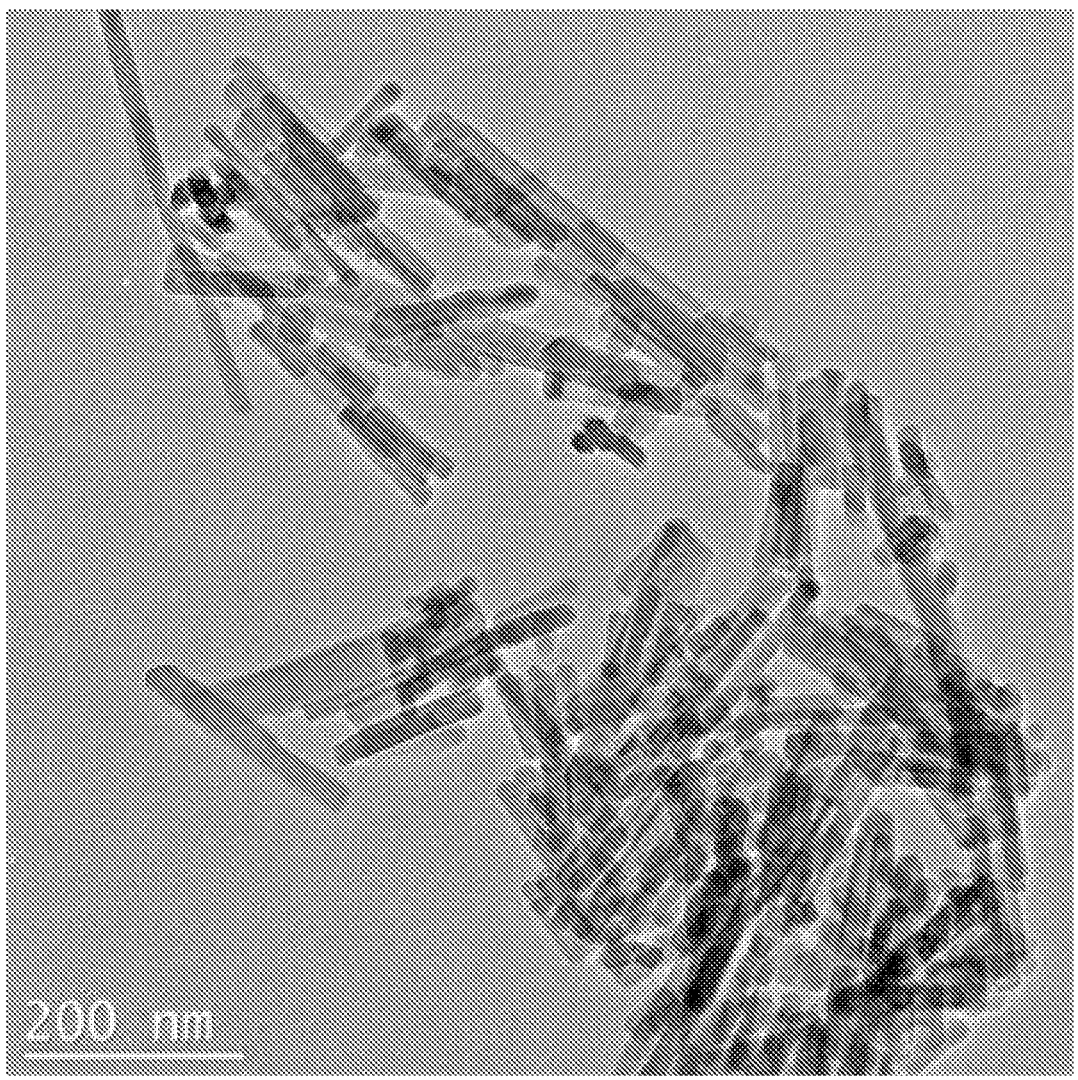
FIG. 3 shows a transmission electron micrograph of the dried product in Example 1.
Figure 4:
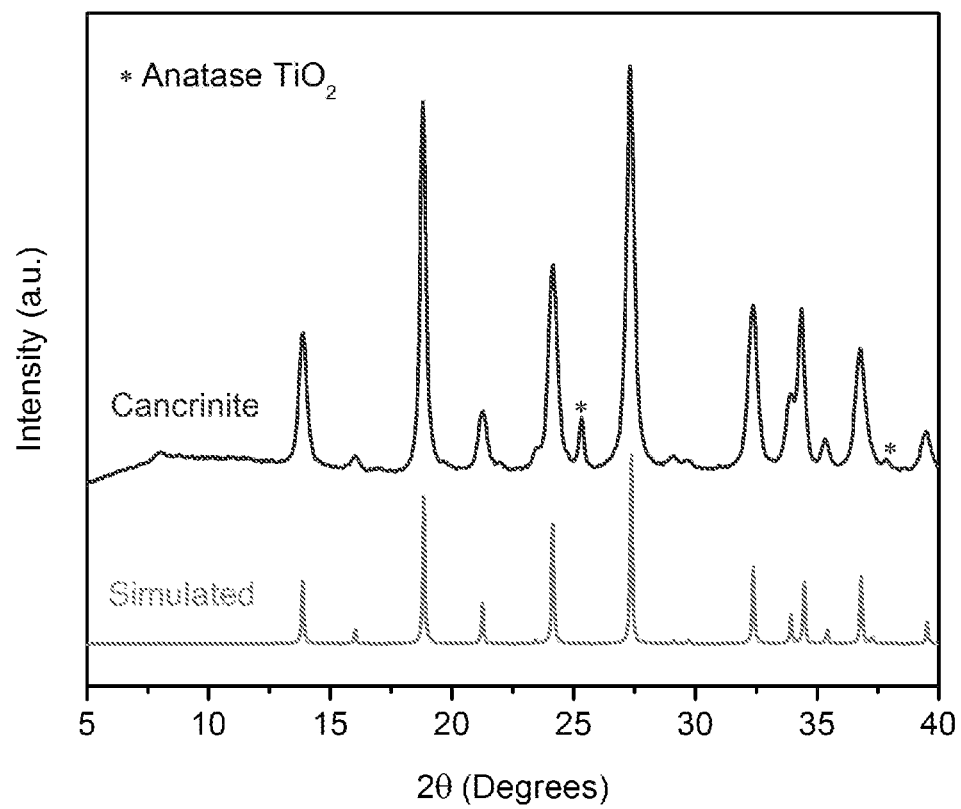
FIG. 4 shows the powder X-ray diffraction pattern of the oven-dried sample in Example 1.
Figure 5:
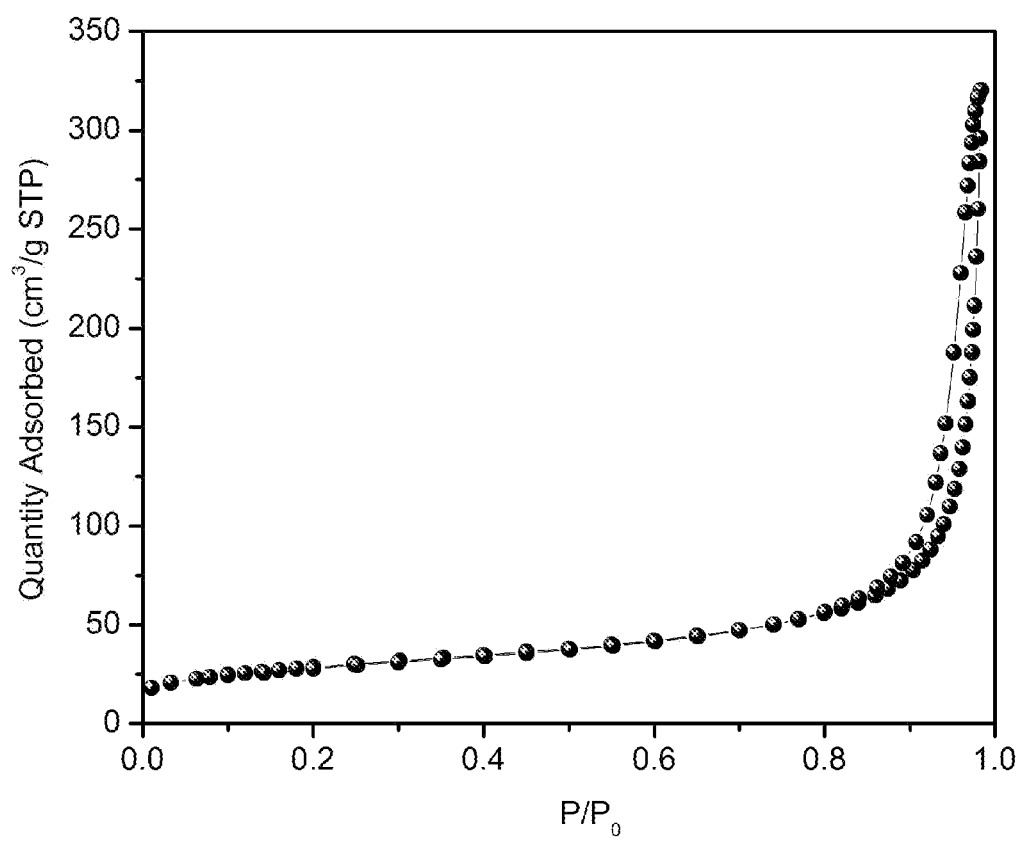
FIG. 5 shows $N_2$ sorption isotherms of the oven-dried sample in Example 1.
Figure 6:
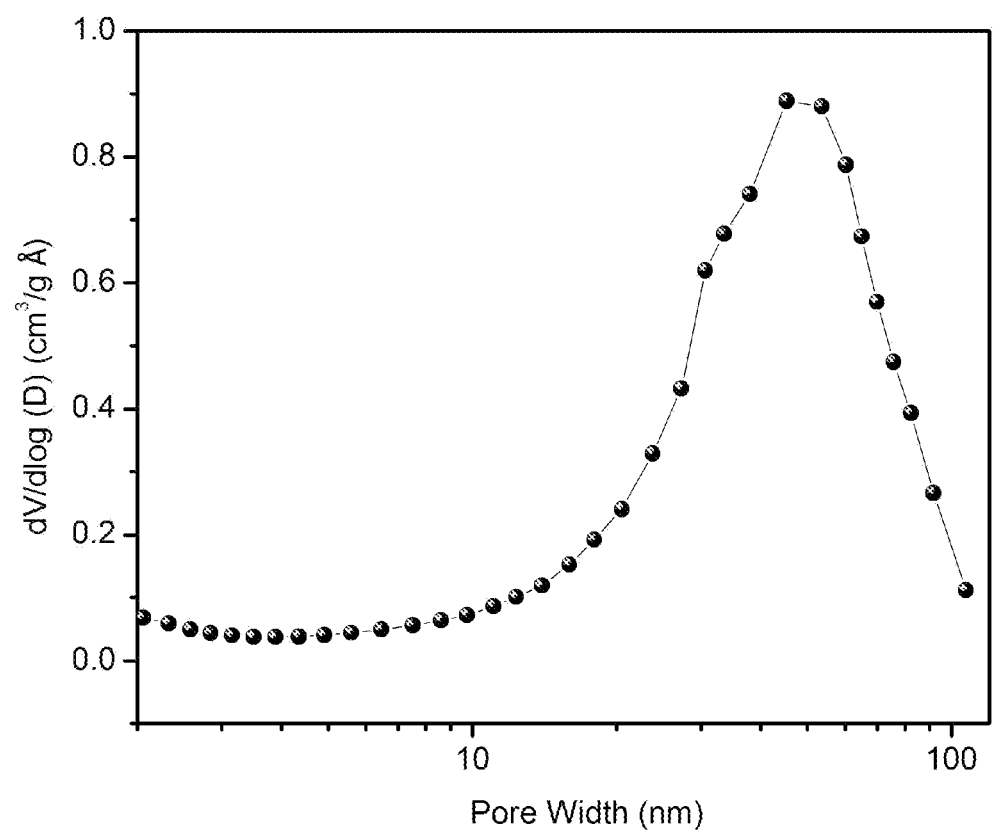
FIG. 6 shows Barrett-Joyner-Halenda (BJH) pore size distributions of the oven-dried sample in Example 1.
Figure 7:
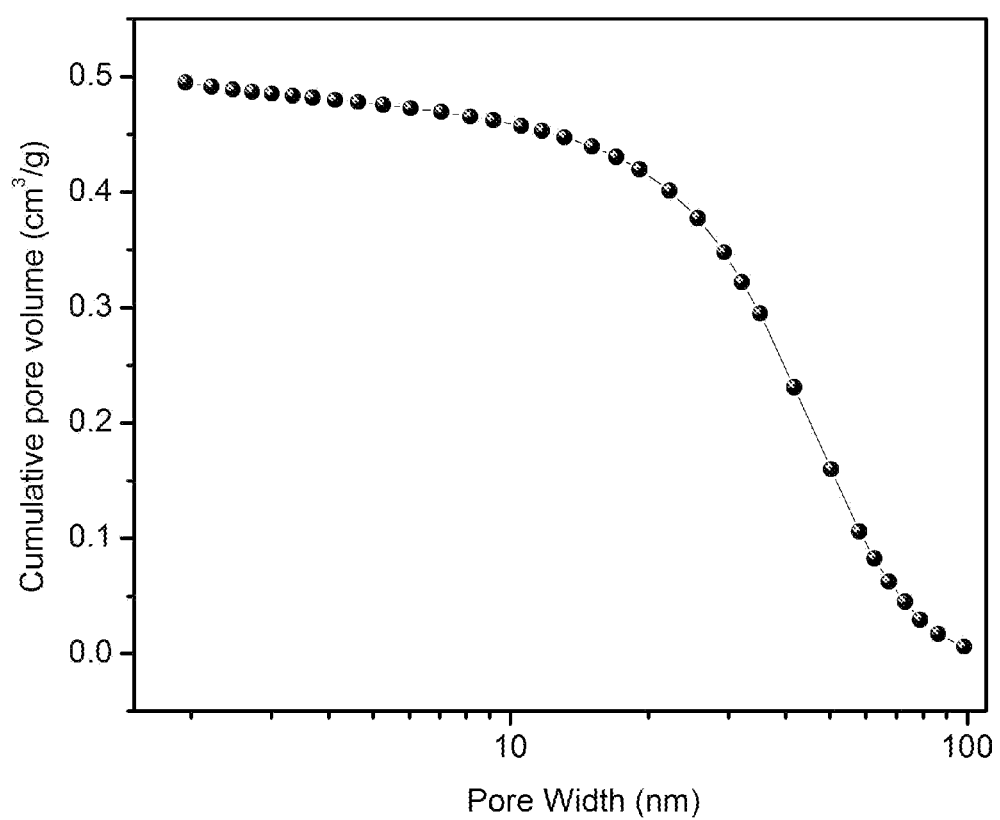
FIG. 7 shows Barrett-Joyner-Halenda (BJH) cumulative pore volume as a function of the pore width of the oven-dried sample in Example 1.

6.37 g of NaOH was dissolved in 6.28 g of deionized water in an ice bath. 11.01 g of sodium silicate (~10.6% $Na_2O$, ~26.5% $SiO_2$) was added subsequently into the NaOH solution and stirred in a water bath with a laboratory mixer at 800 rpm, until the solution became homogeneous by visual inspection. Into the solution, 5.50 g of metakaolin (MetaMax®) was added and stirring was continued at 800 rpm for about 40 min, which yielded a geopolymer resin having approximate nominal Na:Al:Si atomic ratios of 4:1:2. This geopolymer resin was poured into a polypropylene tube, sealed airtight, and heated at 120° C. for 24 hours in a lab oven to give a paste-like geopolymer resin material with a pH value of about 14. The paste was taken out of the container, mixed with a copious amount of deionized water, and subjected to centrifugation at 5000 rpm for 10 min. The resulting clear supernatant solution (pH about 14) was decanted to obtain a wet off-white paste. The mixing with deionized water, centrifugation and decanting steps were repeated until the supernatant liquid attained near neutral pH. The supernatant was decanted to give a wet off-white paste. The dynamic light scattering experiments indicated an average particle size of about 191 nm. FIG. 2 shows the particle size distribution from the dynamic light scattering experiment. It is noted that the paste was thixotropic. FIG. 3 shows a TEM image of the product. After drying at 90° C., the product showed a CAN structure from the powder X-ray diffraction studies (FIG. 4). FIG. 5 shows the $N_2$ sorption isotherms of the oven-dried sample. FIG. 6 shows the corresponding the BJH pore distributions of the oven-dried sample. FIG. 7 shows the corresponding BJH cumulative pore volume as a function of the pore width of the oven-dried sample. The product showed a mesopore volume of 0.5 $cm^3/g$ and a surface area of 103 $m^2/g$. The calculated micropore volume and surface area were 0.006 $cm^3/g$ and 15.6 $m^2/g$, respectively.

Example 2

Figure 8:
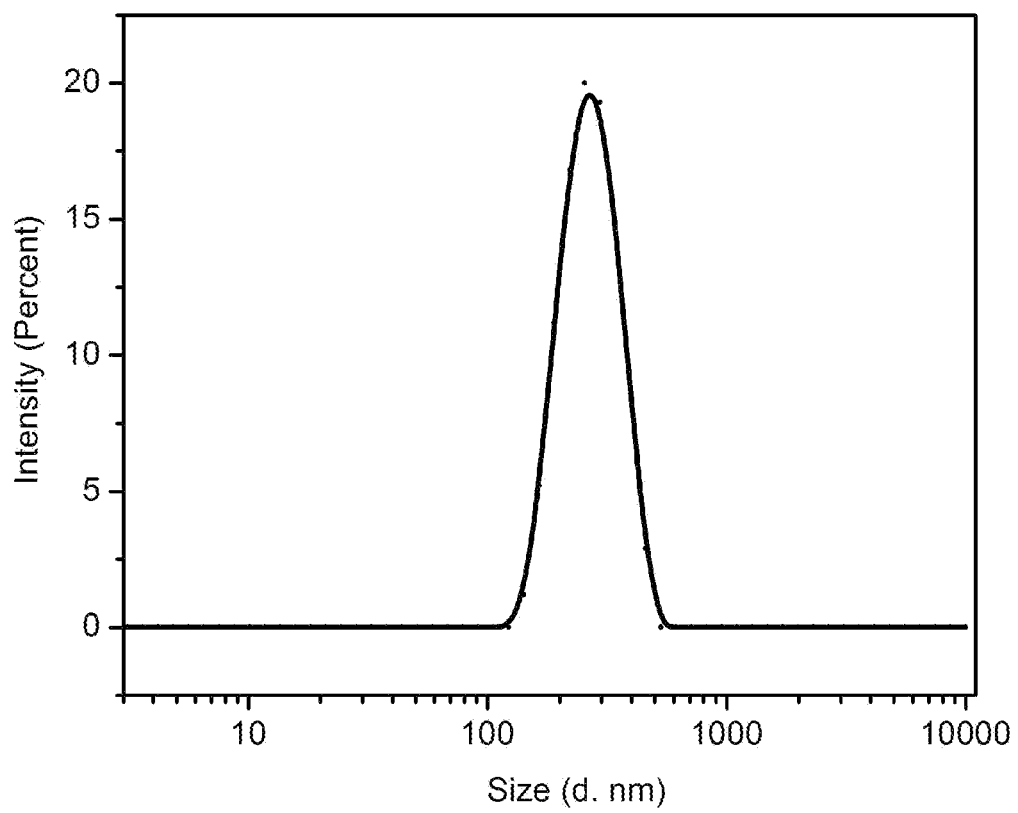
FIG. 8 shows the dynamic light scattering particle size distribution of the wet product in Example 2.
Figure 9:
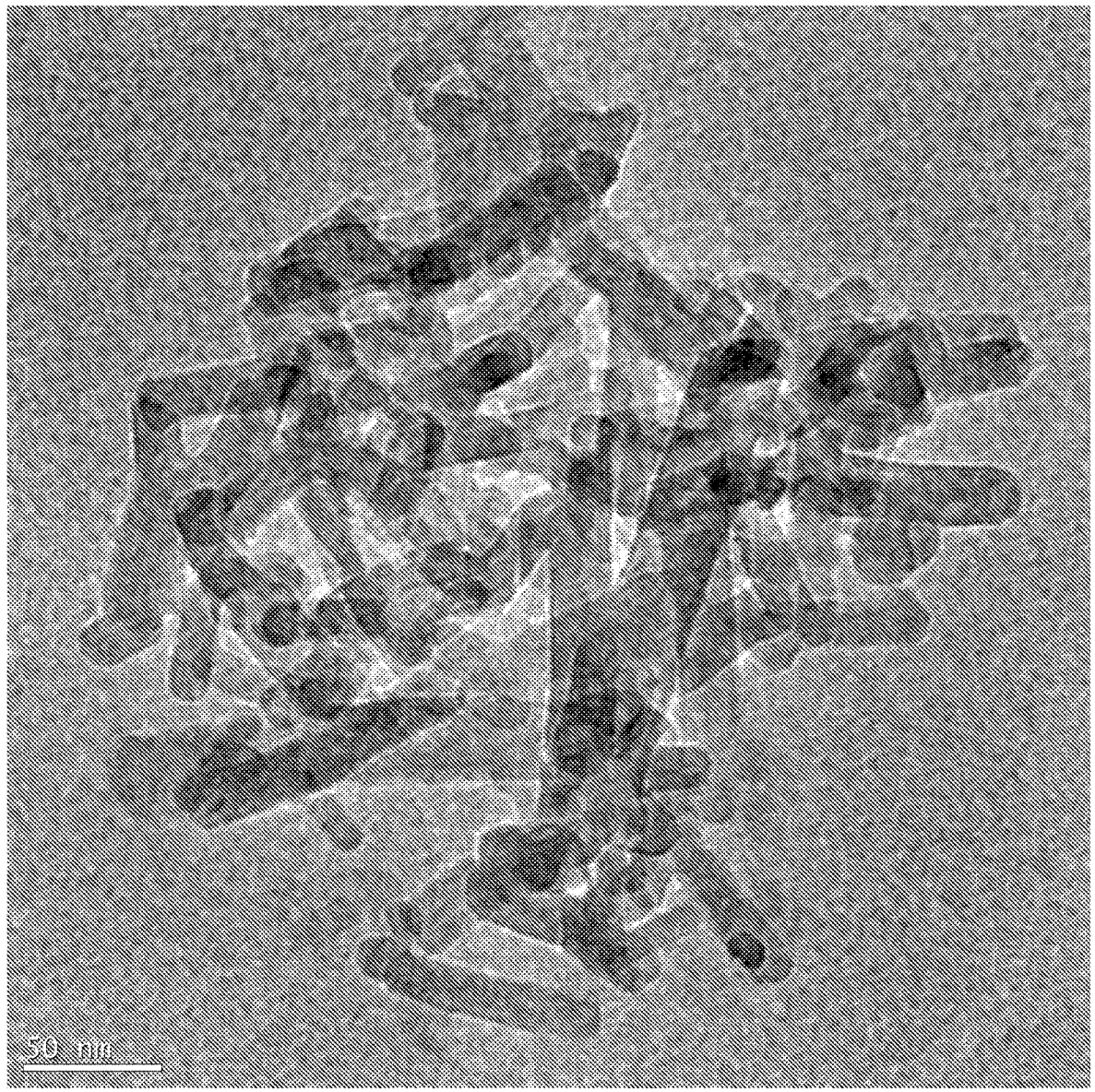
FIG. 9 shows a transmission electron micrograph of the dried product in Example 2.
Figure 10:
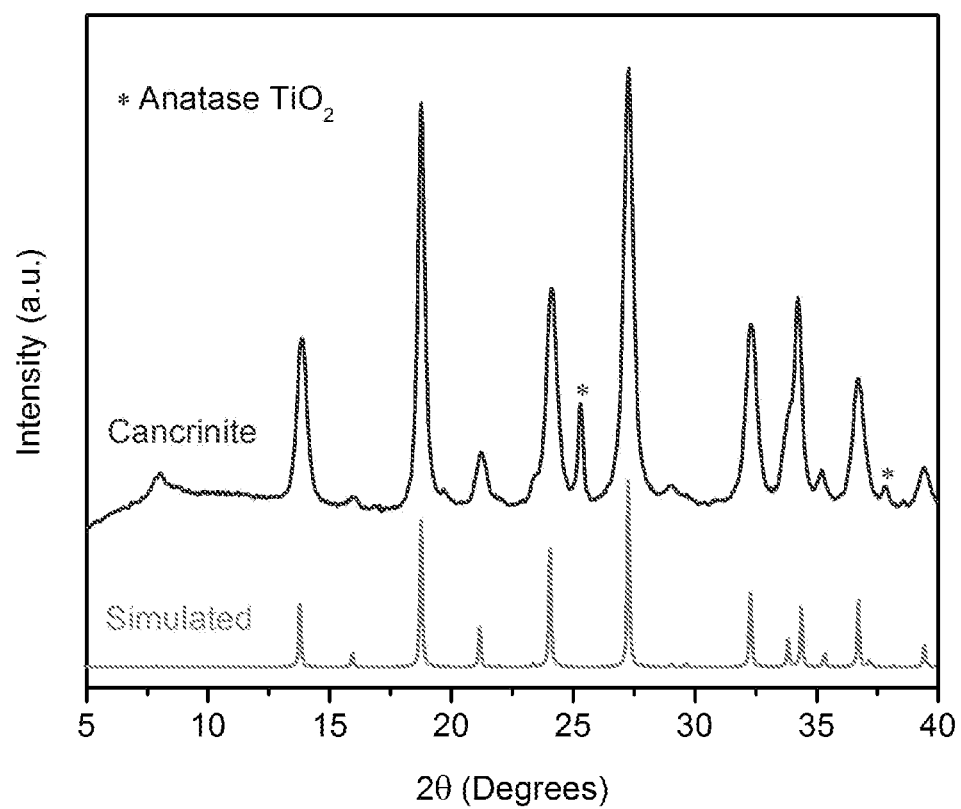
FIG. 10 shows the powder X-ray diffraction pattern of the oven-dried sample in Example 2.
Figure 11:
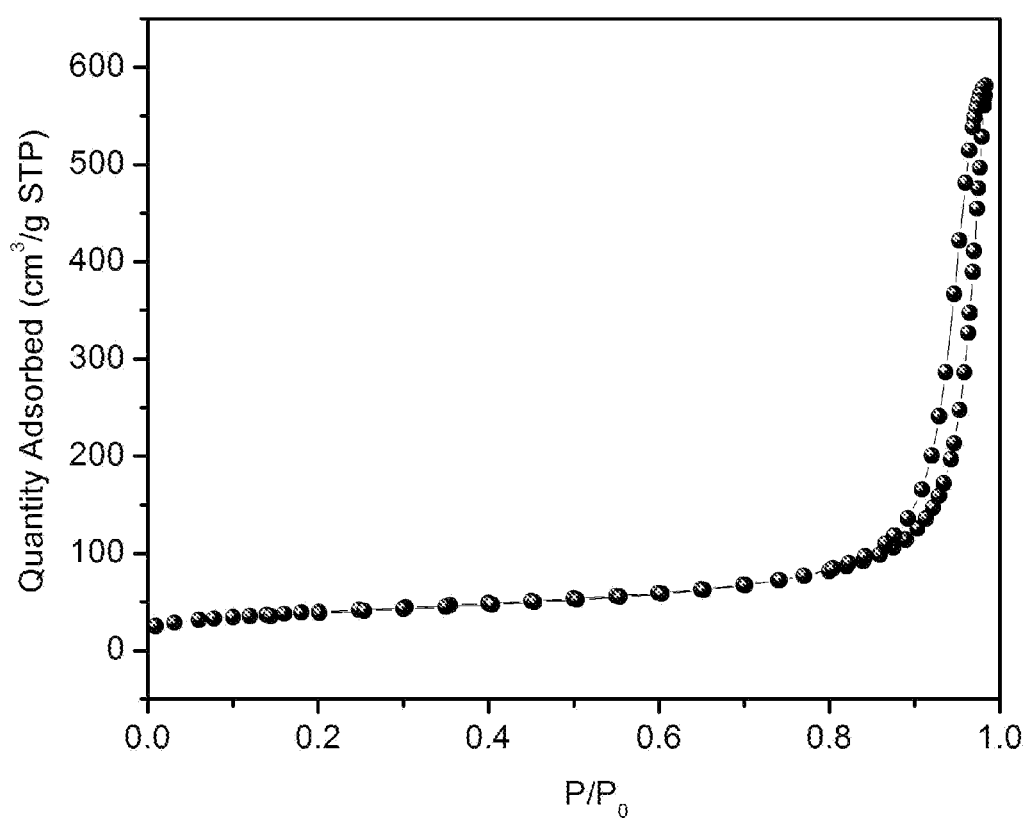
FIG. 11 shows $N_2$ sorption isotherms of the oven-dried sample in Example 2.
Figure 12:
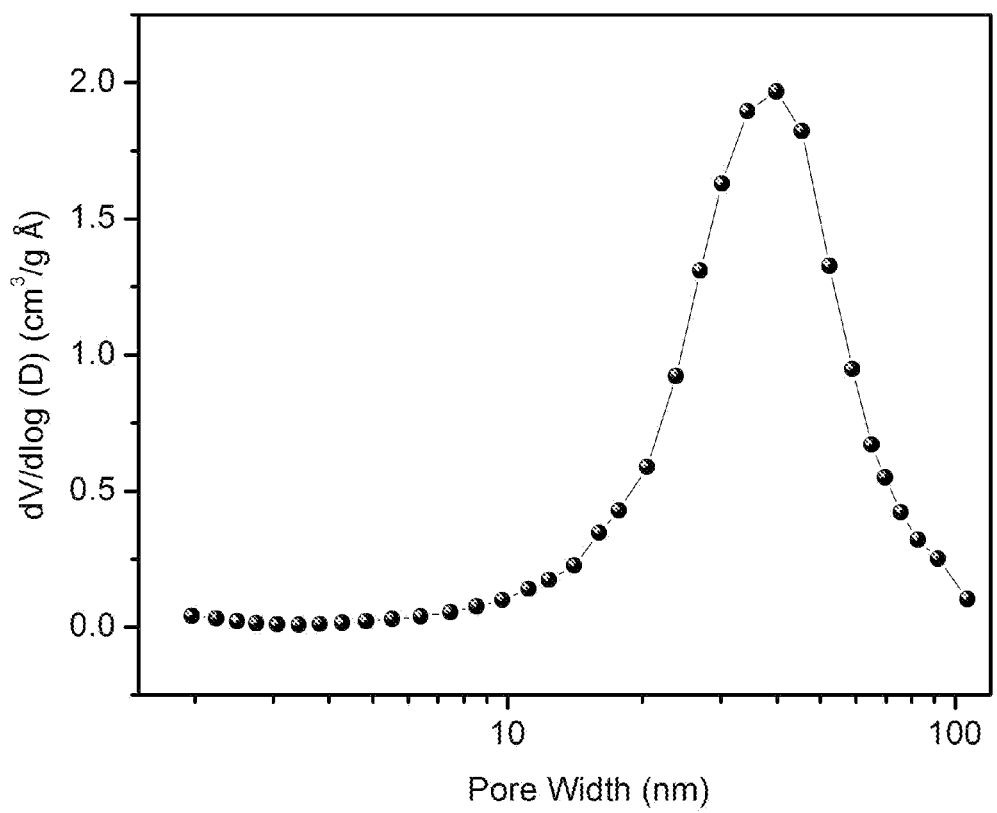
FIG. 12 shows Barrett-Joyner-Halenda (BJH) pore size distributions of the oven-dried sample in Example 2.
Figure 13:
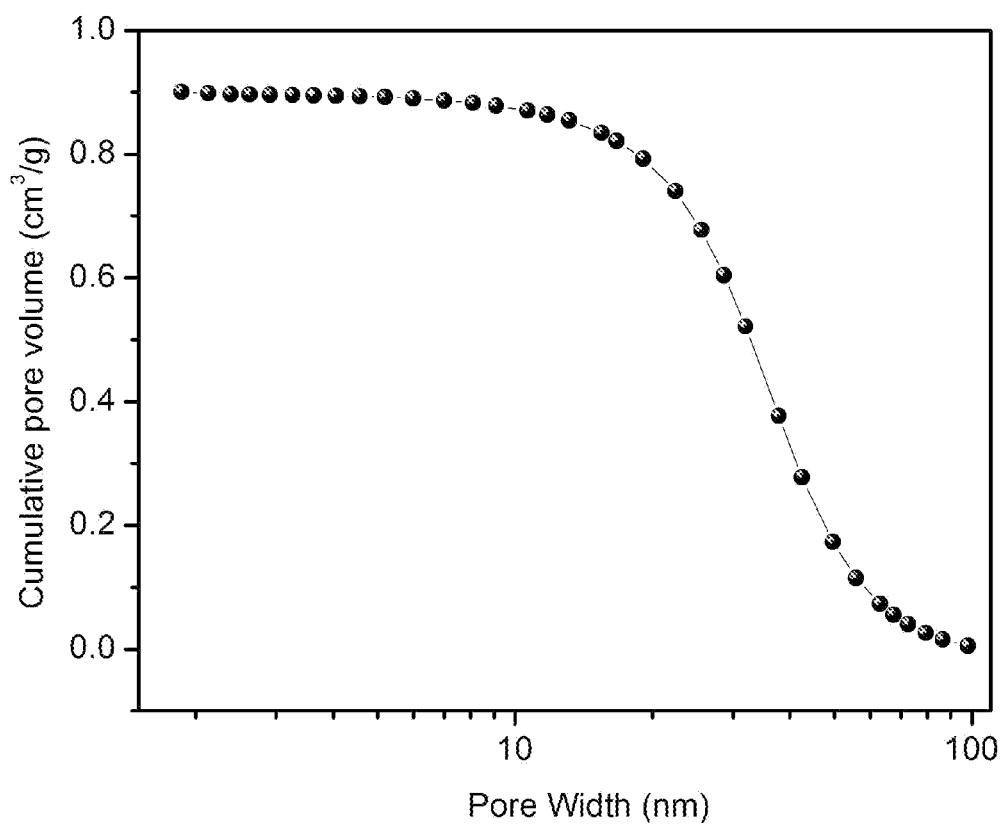
FIG. 13 shows Barrett-Joyner-Halenda (BJH) cumulative pore volume as a function of the pore width of the oven-dried sample in Example 2.

6.37 g of NaOH was dissolved in 6.28 g of deionized water in an ice bath. 11.01 g of sodium silicate (~10.6% $Na_2O$, ~26.5% $SiO_2$) was added subsequently into the NaOH solution and stirred in a water bath with a laboratory mixer at 800 rpm, until the solution became homogeneous by visual inspection. Into the solution, 5.50 g of metakaolin (MetaMax®) was added and stirring was continued at 800 rpm for about 40 min, which yielded a geopolymer resin having approximate nominal Na:Al:Si atomic ratios of 4:1:2. This geopolymer resin was poured into a polypropylene tube, sealed airtight, and heated at 120° C. for 6 hours in a lab oven to give a paste-like geopolymer resin material with a pH value of about 14. The paste was taken out of the container, mixed with a copious amount of deionized water, and subjected to centrifugation at 5000 rpm for 10 min. The resulting clear supernatant solution (pH about 14) was decanted to obtain a wet off-white paste. The mixing with deionized water, centrifugation and decanting steps were repeated until the supernatant liquid attained near neutral pH. The supernatant was decanted to give a wet off-white paste. The dynamic light scattering experiments indicated an average particle size of about 308 nm. FIG. 8 shows the particle size distribution from the dynamic light scattering experiment. It is noted that the paste was thixotropic. FIG. 9 shows a TEM image of the product. After drying at 90° C., the product showed a CAN structure from the powder X-ray diffraction studies (FIG. 10). FIG. 11 shows the $N_2$ sorption isotherms of the oven-dried sample. FIG. 12 shows the corresponding the BJH pore distributions of the oven-dried sample. FIG. 13 shows the corresponding BJH cumulative pore volume as a function of the pore width of the oven-dried sample. The product showed a mesopore volume of 0.9 $cm^3/g$ and a surface area of 143 $m^2/g$. The calculated micropore volume and surface area were 0.009 $cm^3/g$ and 22.8 $m^2/g$, respectively.

Example 3

Figure 14:
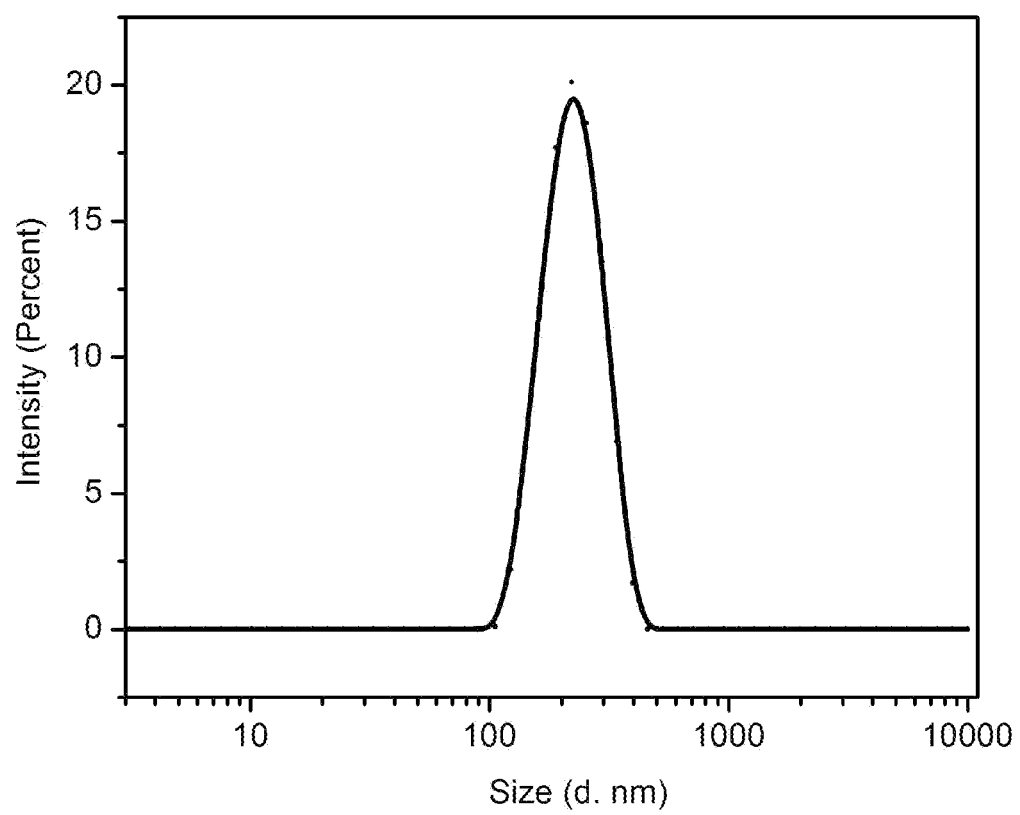
FIG. 14 shows the dynamic light scattering particle size distribution of the wet product in Example 3.
Figure 15:
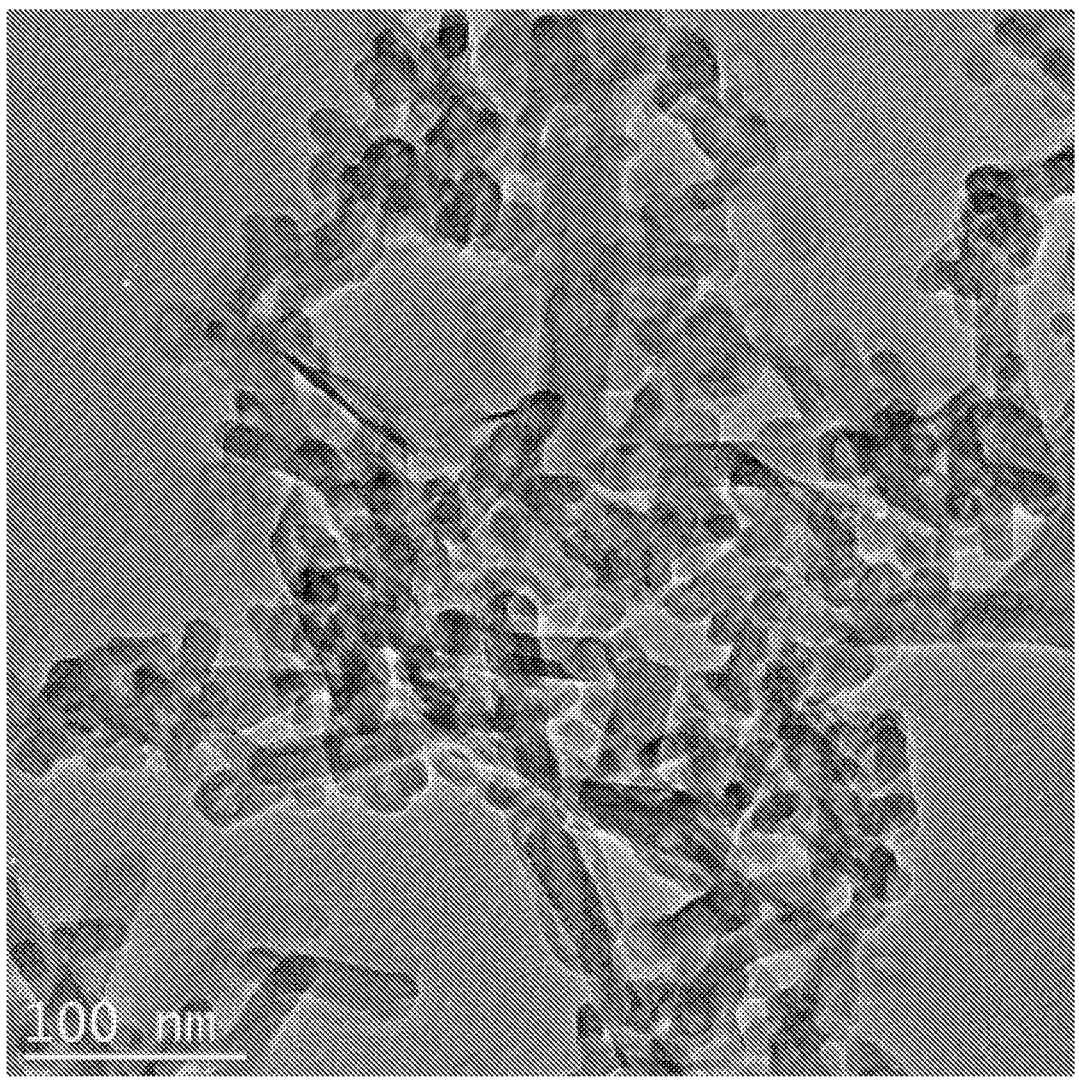
FIG. 15 shows a transmission electron micrograph of the dried product in Example 3.
Figure 16:
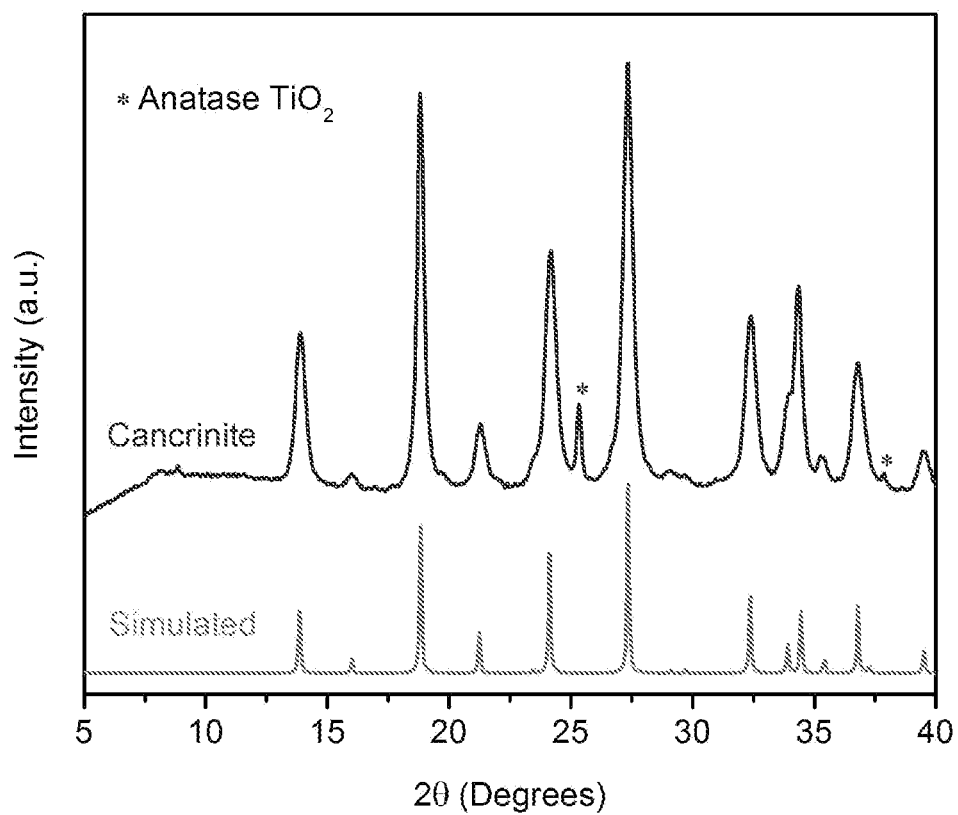
FIG. 16 shows the powder X-ray diffraction pattern of the oven-dried sample in Example 3.
Figure 17:
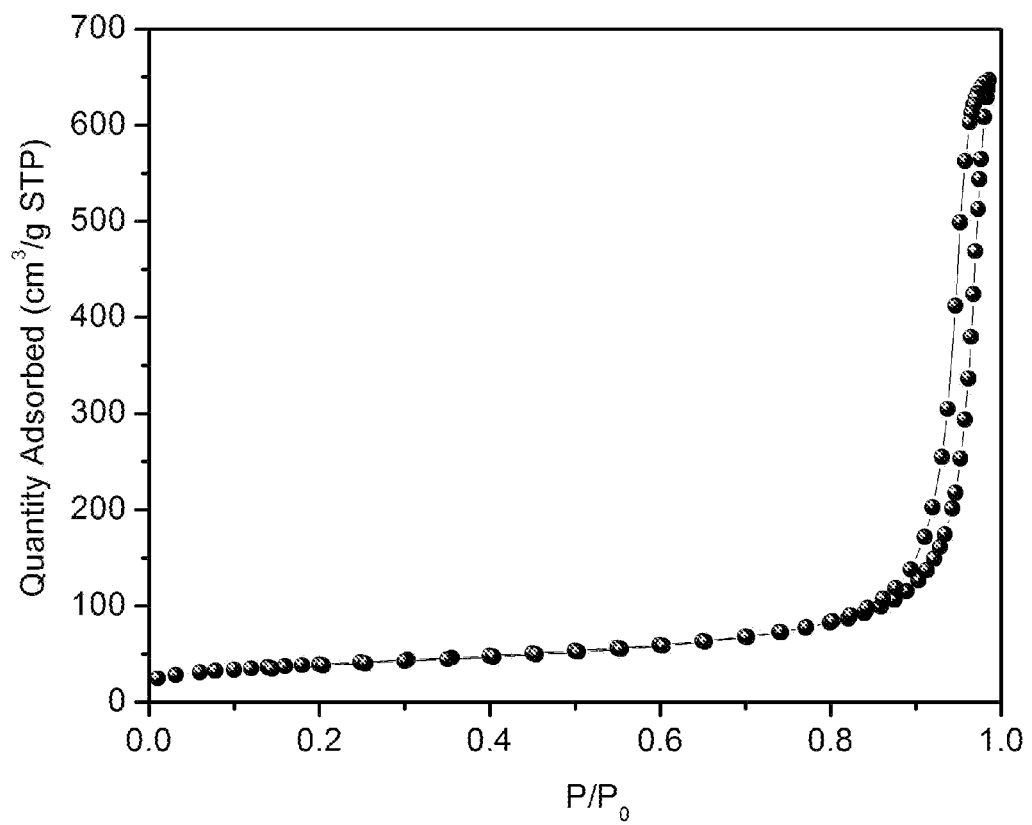
FIG. 17 shows $N_2$ sorption isotherms of the oven-dried sample in Example 3.
Figure 18:
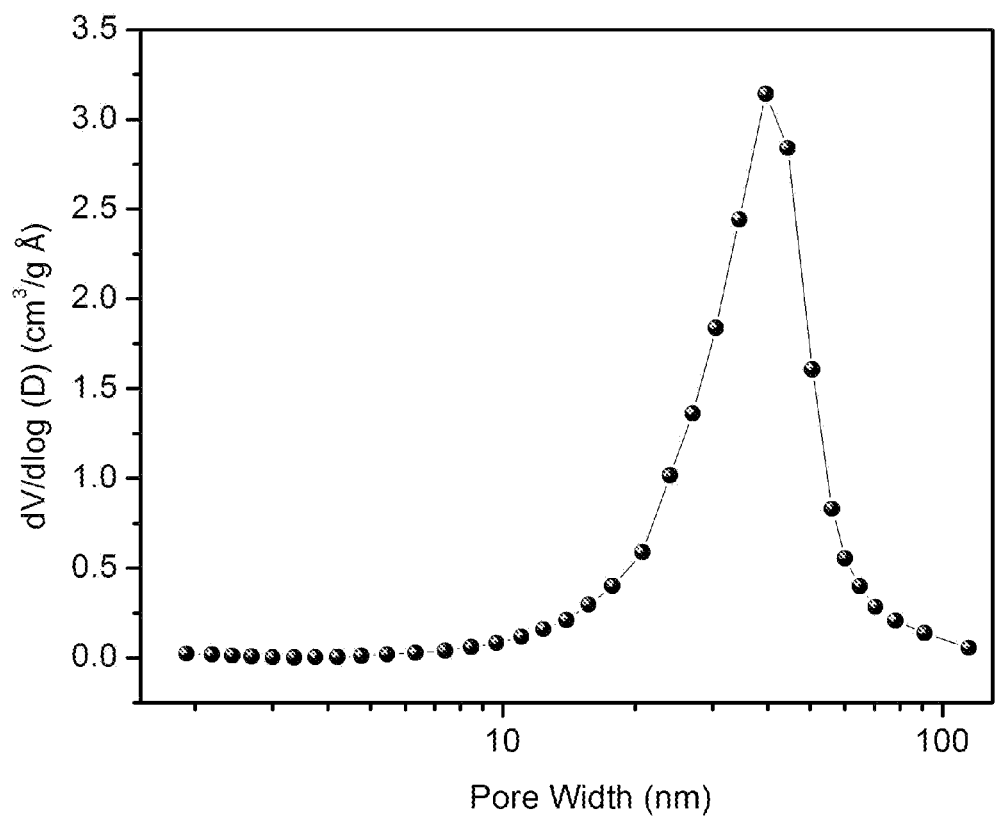
FIG. 18 shows Barrett-Joyner-Halenda (BJH) pore size distributions of the oven-dried sample in Example 3.
Figure 19:
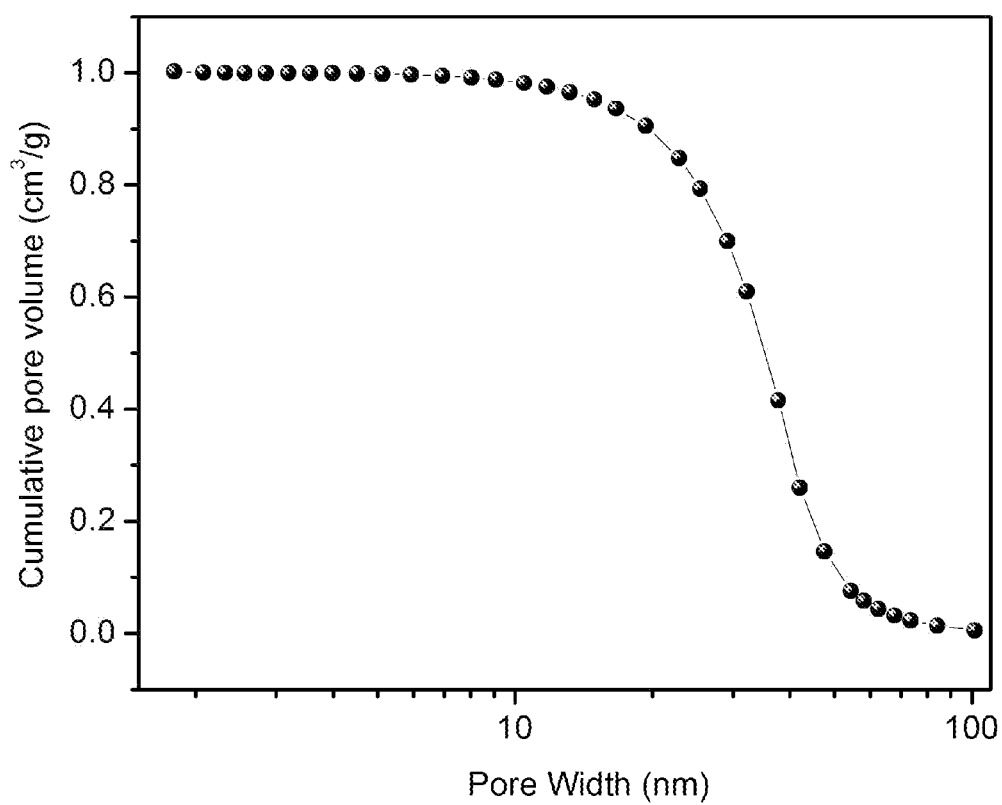
FIG. 19 shows Barrett-Joyner-Halenda (BJH) cumulative pore volume as a function of the pore width of the oven-dried sample in Example 3.

6.37 g of NaOH was dissolved in 6.28 g of deionized water in an ice bath. 11.01 g of sodium silicate (~10.6% $Na_2O$, ~26.5% $SiO_2$) was added subsequently into the NaOH solution and stirred in a water bath with a laboratory mixer at 800 rpm, until the solution became homogeneous by visual inspection. Into the solution, 5.50 g of metakaolin (MetaMax®) was added and stirring was continued at 800 rpm for about 40 min, which yielded a geopolymer resin having approximate nominal Na:Al:Si atomic ratios of 4:1:2. This geopolymer resin was poured into a polypropylene tube, sealed airtight, and heated at 90° C. for 24 hours in a lab oven to give a paste-like geopolymer resin material with a pH value of about 14. The paste was taken out of the container, mixed with a copious amount of deionized water, and subjected to centrifugation at 5000 rpm for 10 min. The resulting clear supernatant solution (pH about 14) was decanted to obtain a wet off-white paste. The mixing with deionized water, centrifugation and decanting steps were repeated until the supernatant liquid attained near neutral pH. The supernatant was decanted to give a wet off-white paste. The dynamic light scattering experiments indicated an average particle size of about 260 nm. FIG. 14 shows the particle size distribution from the dynamic light scattering experiment. It is noted that the paste was thixotropic. FIG. 15 shows a TEM image of the product. After drying at 90° C., the product showed a CAN structure from the powder X-ray diffraction studies (FIG. 16). FIG. 17 shows the $N_2$ sorption isotherms of the oven-dried sample. FIG. 18 shows the corresponding the BJH pore distributions of the oven-dried sample. FIG. 19 shows the corresponding BJH cumulative pore volume as a function of the pore width of the oven-dried sample. The product showed a mesopore volume of 1.00 $cm^3/g$ and a surface area of 141 $m^2/g$. The calculated micropore volume and surface area were 0.008 $cm^3/g$ and 19.9 $m^2/g$, respectively.

Example 4

Figure 20:
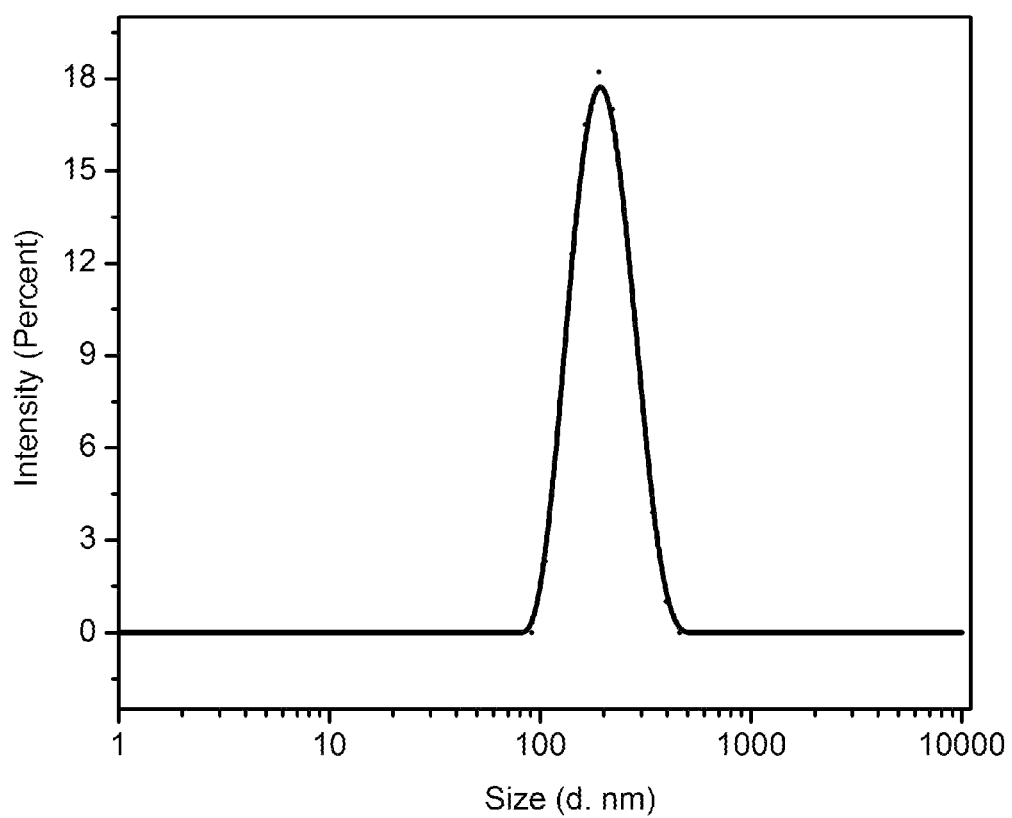
FIG. 20 shows the dynamic light scattering particle size distribution of the wet product in Example 4.
Figure 21:
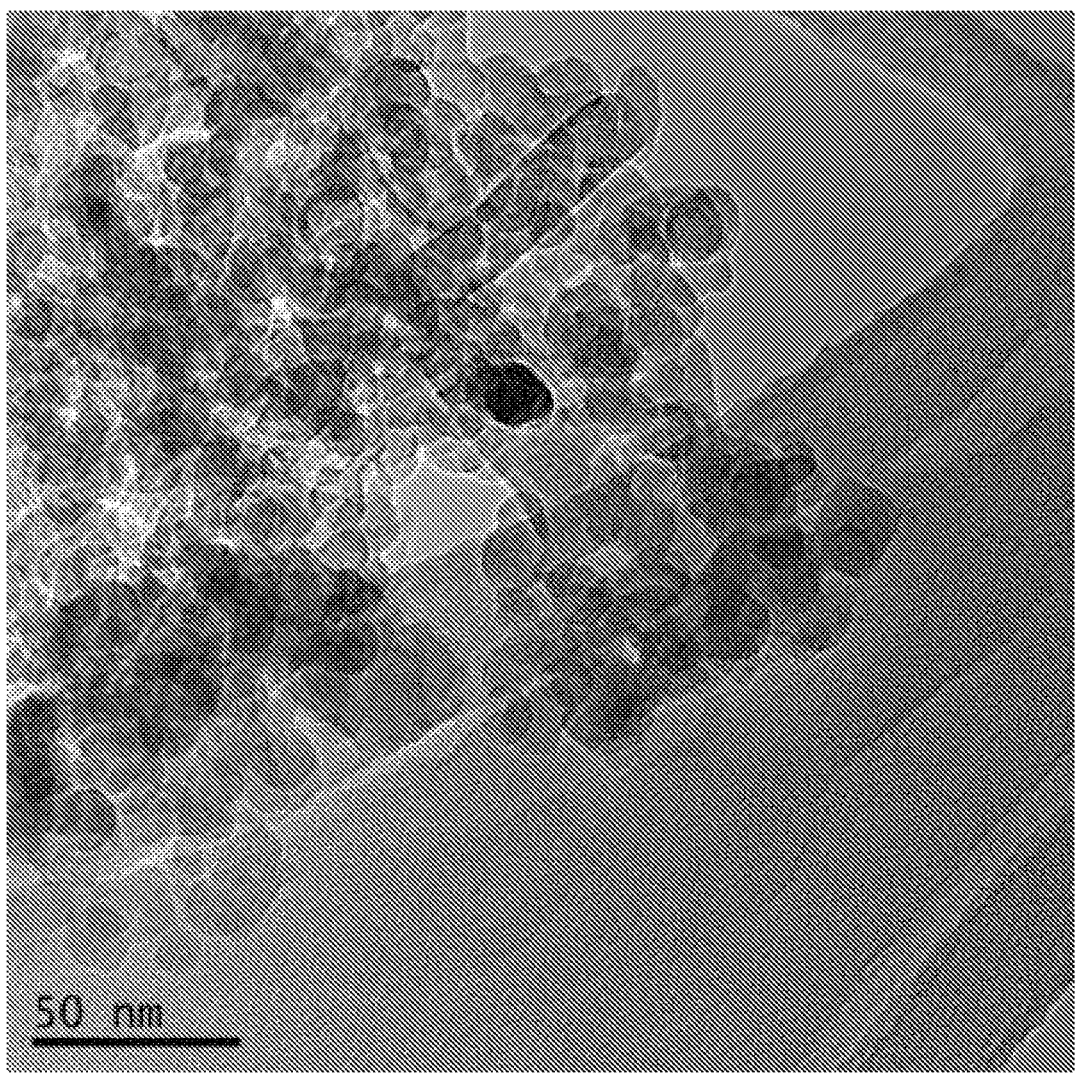
FIG. 21 shows a transmission electron micrograph of the dried product in Example 4.
Figure 22:
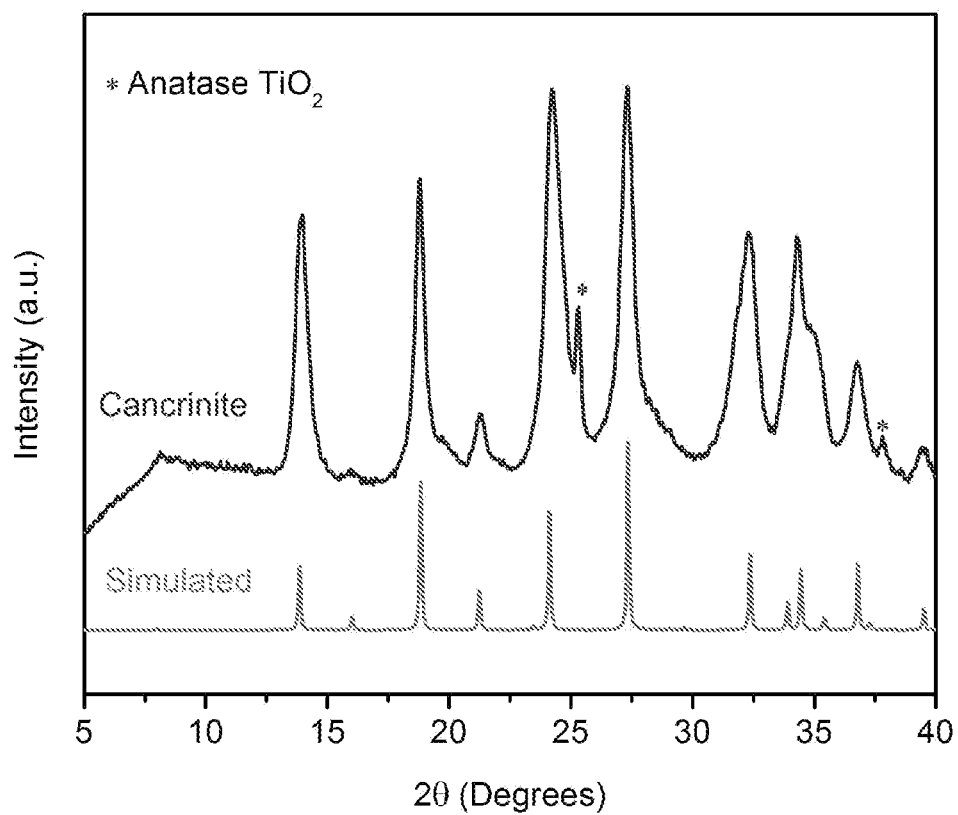
FIG. 22 shows the powder X-ray diffraction pattern of the oven-dried sample in Example 4.
Figure 23:
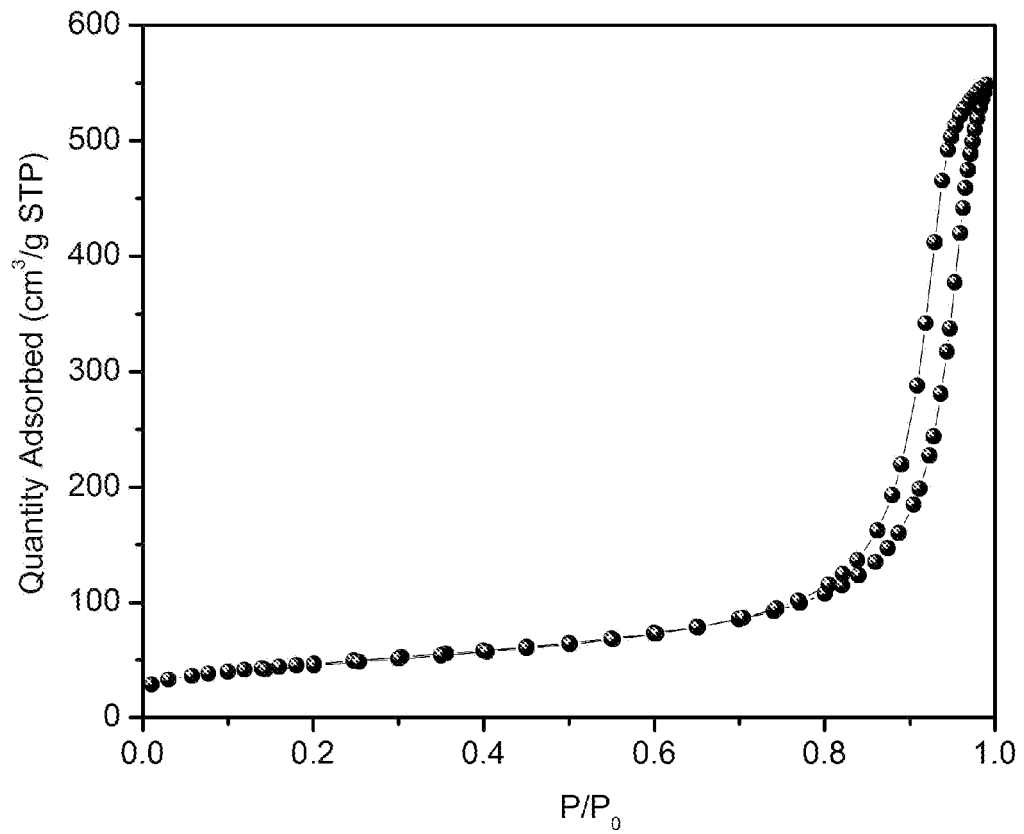
FIG. 23 shows $N_2$ sorption isotherms of the oven-dried sample in Example 4.
Figure 24:
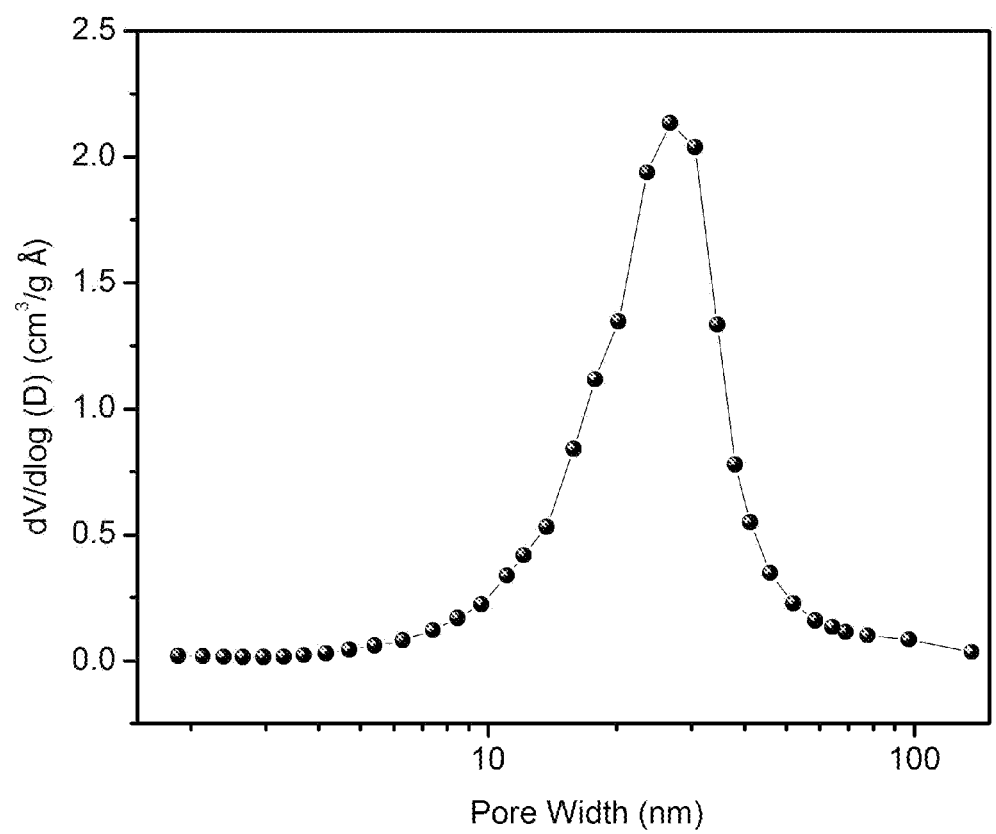
FIG. 24 shows Barrett-Joyner-Halenda (BJH) pore size distributions of the oven-dried sample in Example 4.
Figure 25:
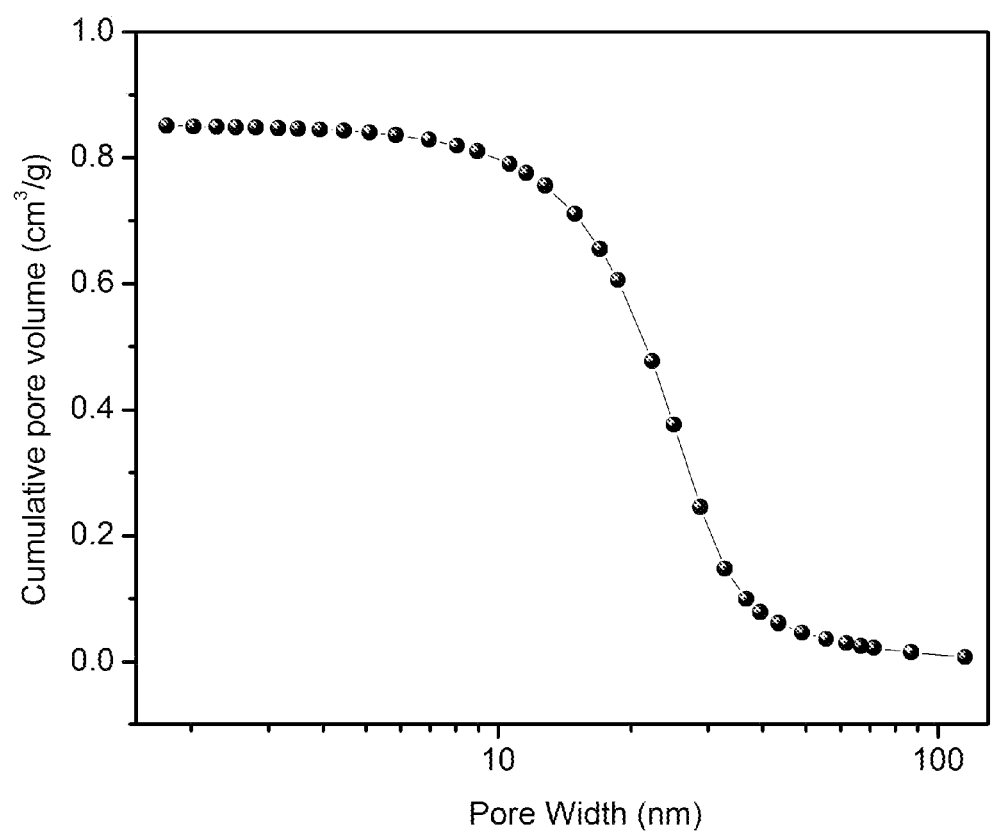
FIG. 25 shows Barrett-Joyner-Halenda (BJH) cumulative pore volume as a function of the pore width of the oven-dried sample in Example 4.

6.37 g of NaOH was dissolved in 6.28 g of deionized water in an ice bath. 11.01 g of sodium silicate (~10.6% $Na_2O$, ~26.5% $SiO_2$) was added subsequently into the NaOH solution and stirred in a water bath with a laboratory mixer at 800 rpm, until the solution became homogeneous by visual inspection. Into the solution, 5.50 g of metakaolin (MetaMax®) was added and stirring was continued at 800 rpm for about 40 min, which yielded a geopolymer resin having approximate nominal Na:Al:Si atomic ratios of 4:1:2. This geopolymer resin was poured into a polypropylene tube, sealed airtight, and heated at 90° C. for 6 hours in a lab oven to give a paste-like geopolymer resin material with a pH value of about 14. The paste was taken out of the container, mixed with a copious amount of deionized water, and subjected to centrifugation at 5000 rpm for 10 min. The resulting clear supernatant solution (pH about 14) was decanted to obtain a wet off-white paste. The mixing with deionized water, centrifugation and decanting steps were repeated until the supernatant liquid attained near neutral pH. The supernatant was decanted to give a wet off-white paste. The dynamic light scattering experiments indicated an average particle size of about 188 nm. FIG. 20 shows the particle size distribution from the dynamic light scattering experiment. It is noted that the paste was thixotropic. FIG. 21 shows a TEM image of the product. After drying at 90° C., the product showed a CAN structure from the powder X-ray diffraction studies (FIG. 22). FIG. 23 shows the $N_2$ sorption isotherms of the oven-dried sample. FIG. 24 shows the corresponding the BJH pore distributions of the oven-dried sample. FIG. 25 shows the corresponding BJH cumulative pore volume as a function of the pore width of the oven-dried sample. The product showed a mesopore volume of 0.85 cm$^3$/g and a surface area of 168 m$^2$/g. The calculated micropore volume and surface area were 0.008 cm$^3$/g and 21.2 m$^2$/g, respectively.

Example 5

Figure 26:
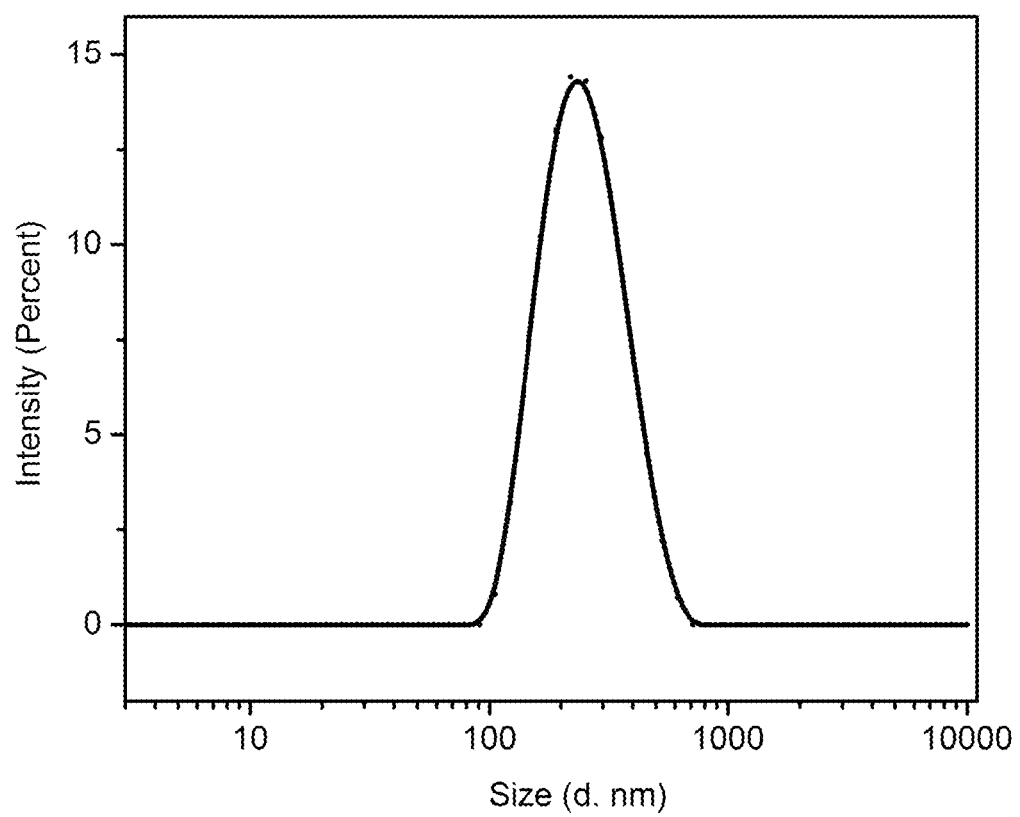
FIG. 26 shows the dynamic light scattering particle size distribution of the wet product in Example 5.
Figure 27:
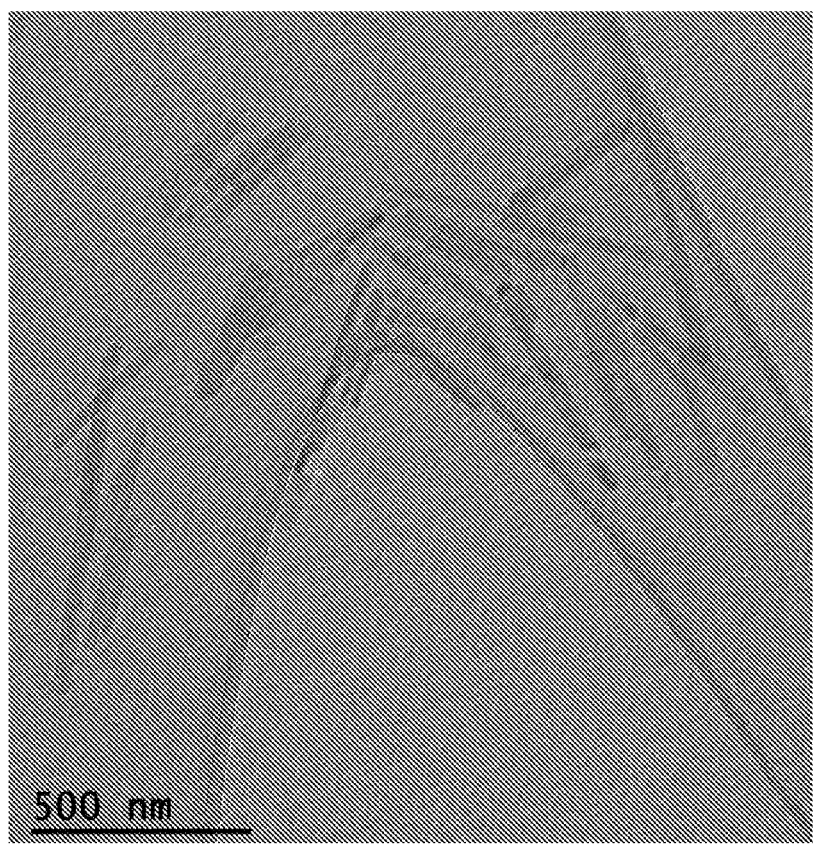
FIG. 27 shows a transmission electron micrograph of the dried product in Example 5.
Figure 28:
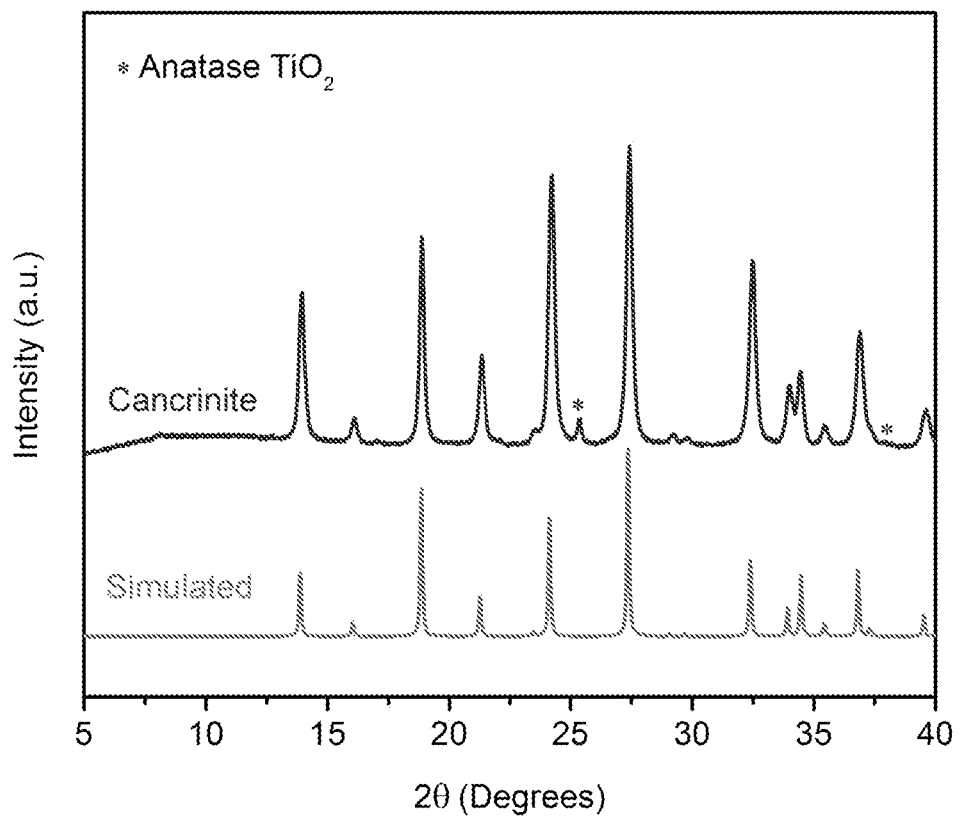
FIG. 28 shows the powder X-ray diffraction pattern of the oven-dried sample in Example 5.
Figure 29:
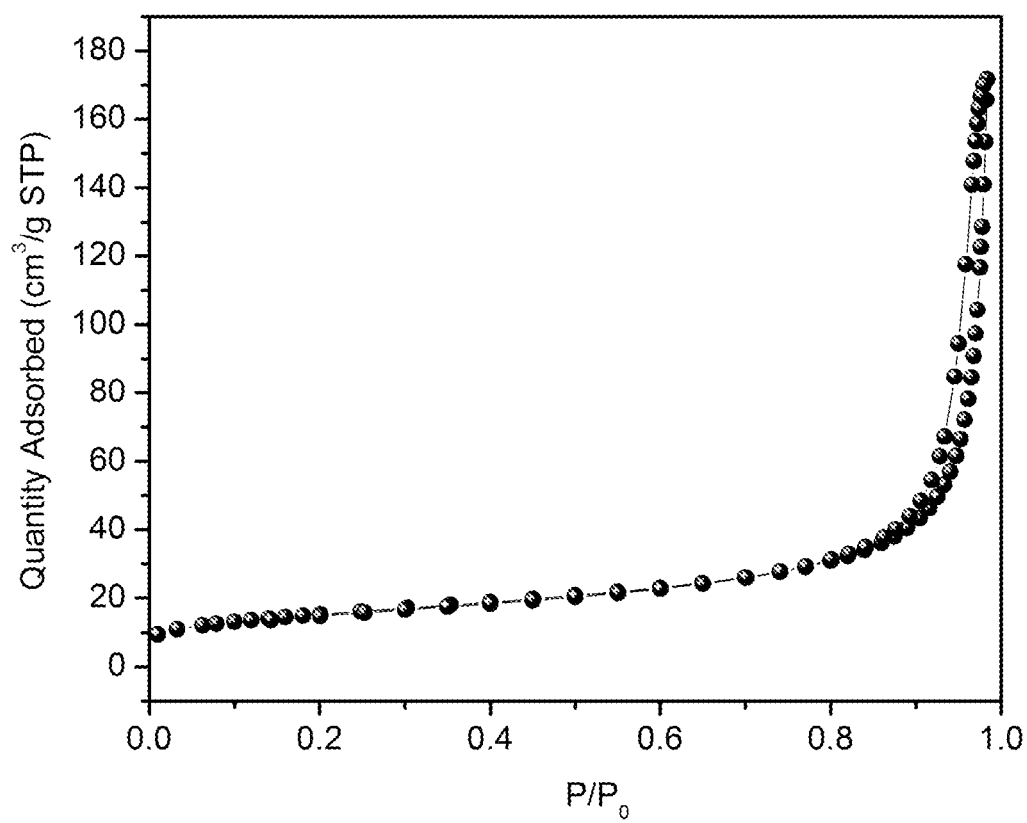
FIG. 29 shows $N_2$ sorption isotherms of the oven-dried sample in Example 5.
Figure 30:
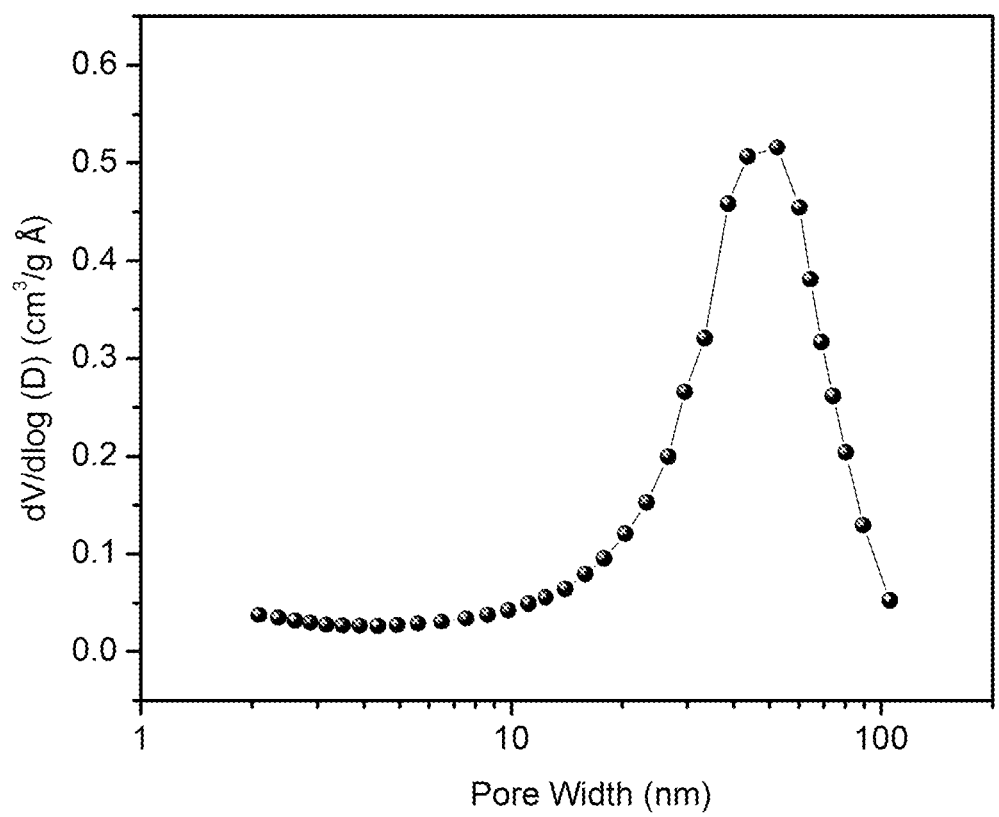
FIG. 30 shows Barrett-Joyner-Halenda (BJH) pore size distributions of the oven-dried sample in Example 5.
Figure 31:
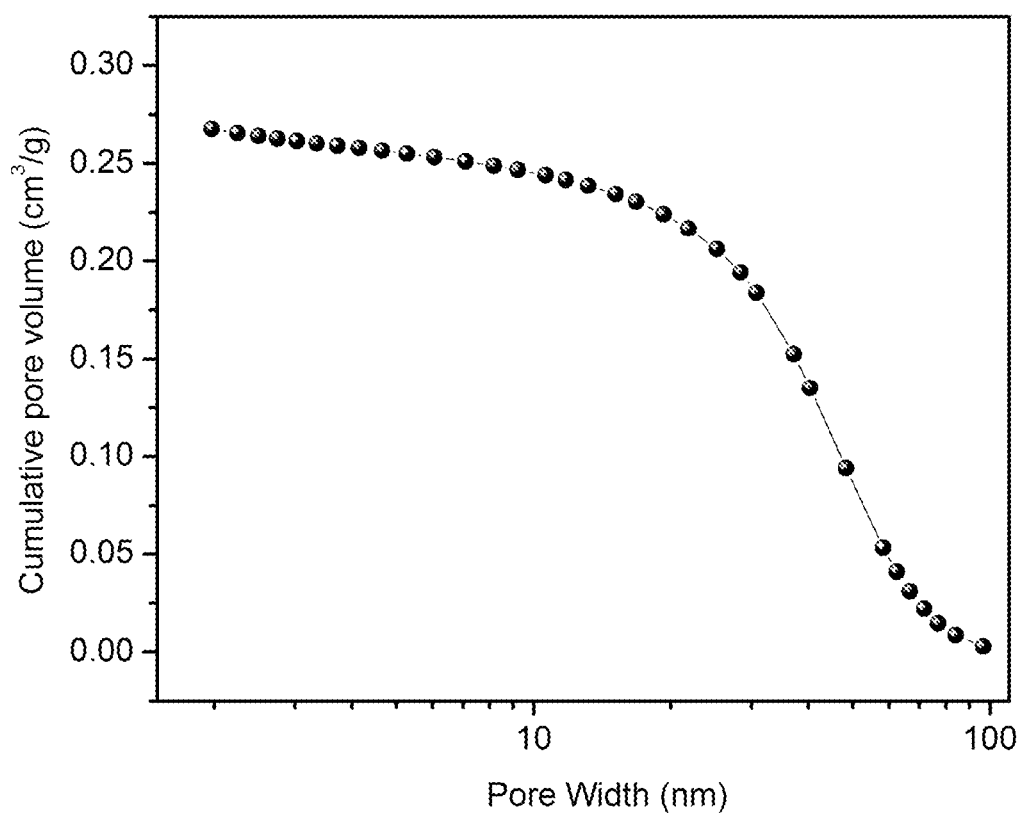
FIG. 31 shows Barrett-Joyner-Halenda (BJH) cumulative pore volume as a function of the pore width of the oven-dried sample in Example 5.

12.74 g of NaOH was dissolved in 12.56 g of deionized water in an ice bath. 22.02 g of sodium silicate (~10.6% $Na_2O$, ~26.5% $SiO_2$) was added subsequently into the NaOH solution and stirred in a water bath with a laboratory mixer at 800 rpm, until the solution became homogeneous by visual inspection. Into the solution, 11.0 g of metakaolin (MetaMax®) was added and stirring was continued at 800 rpm for about 40 min, which yielded a geopolymer resin having approximate nominal Na:Al:Si atomic ratios of 4:1:2. This geopolymer resin was poured into a polypropylene tube, sealed airtight, and heated at 120° C. for 144 hours in a lab oven to give a paste-like geopolymer resin material with a pH value of about 14. The paste was taken out of the container, mixed with a copious amount of deionized water, and subjected to centrifugation at 6000 rpm for 10 min. The resulting clear supernatant solution (pH about 14) was decanted to obtain a wet off-white paste. The mixing with deionized water, centrifugation and decanting steps were repeated until the supernatant liquid attained near neutral pH. The supernatant was decanted to give a wet off-white paste. The dynamic light scattering experiments indicated an average particle size of about 254 nm. FIG. 26 shows the particle size distribution from the dynamic light scattering experiment. It is noted that the paste was thixotropic. FIG. 27 shows a TEM image of the product. After drying at 90° C., the product showed a CAN structure from the powder X-ray diffraction studies (FIG. 28). FIG. 29 shows the $N_2$ sorption isotherms of the oven-dried sample. FIG. 30 shows the corresponding the BJH pore distributions of the oven-dried sample. FIG. 31 shows the corresponding BJH cumulative pore volume as a function of the pore width of the oven-dried sample. The product showed a mesopore volume of 0.27 cm$^3$/g and a surface area of 54.9 m$^2$/g. The calculated micropore volume and surface area were 0.003 cm$^3$/g and 7.1 m$^2$/g, respectively.

Example 6

Figure 32:
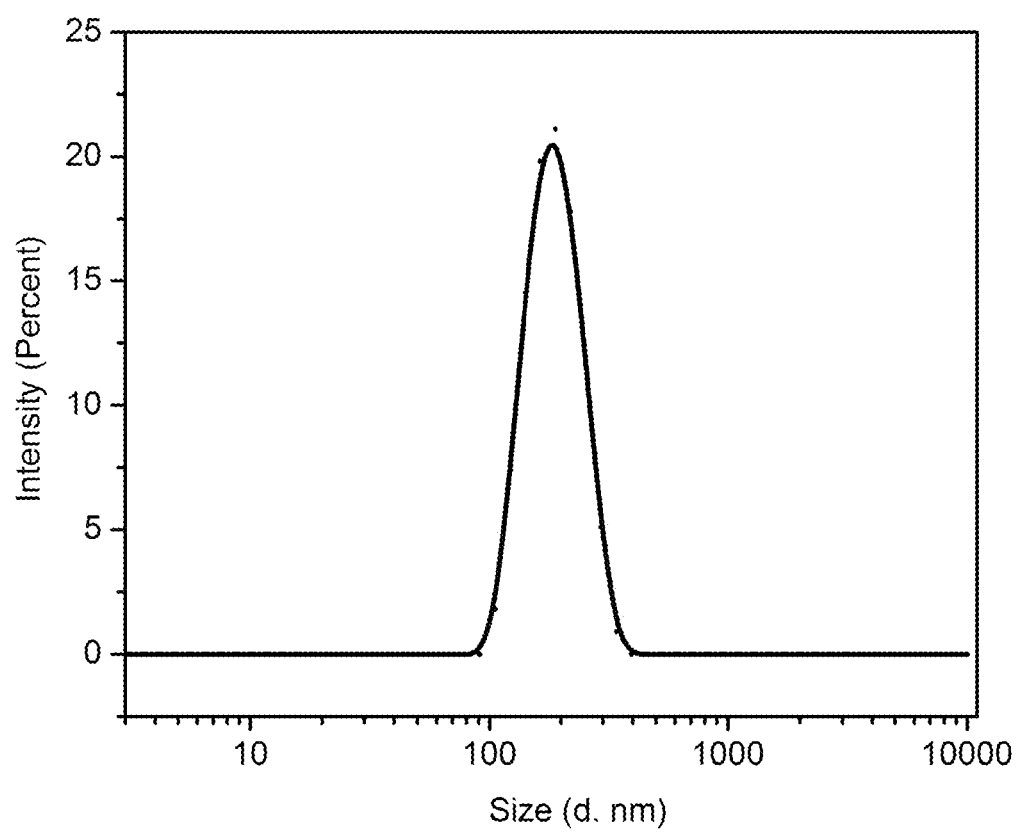
FIG. 32 shows the dynamic light scattering particle size distribution of the wet product in Example 6.
Figure 33:
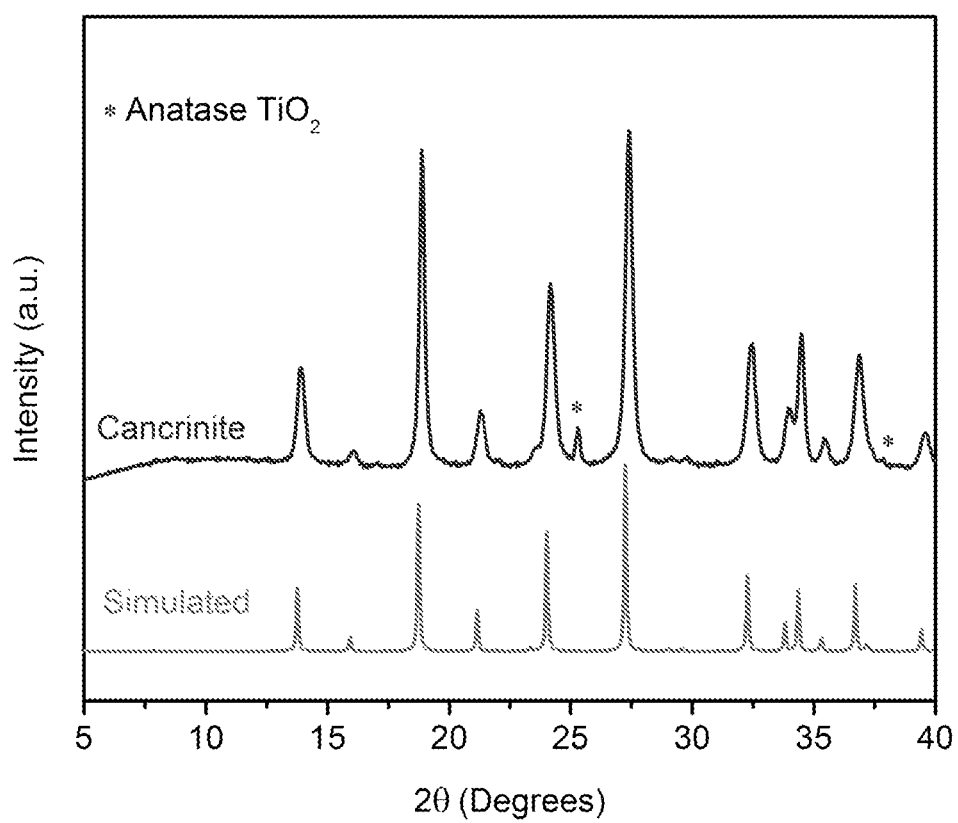
FIG. 33 shows the powder X-ray diffraction pattern of the oven-dried sample in Example 6.
Figure 34:
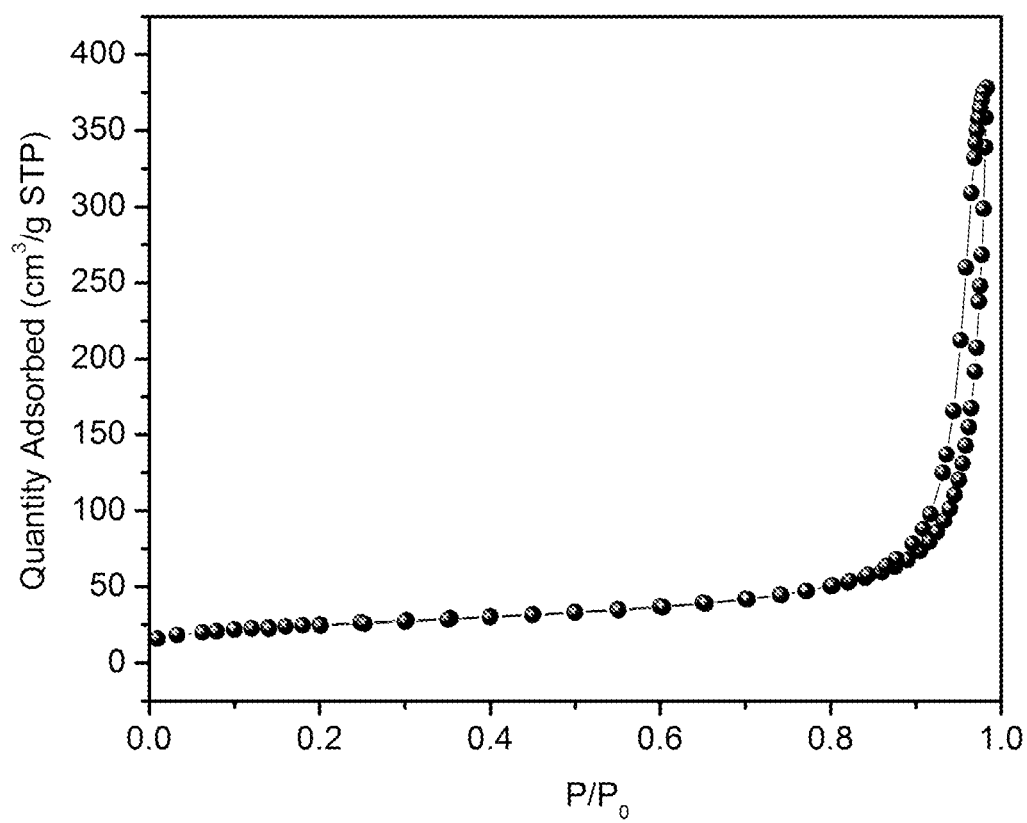
FIG. 34 shows $N_2$ sorption isotherms of the oven-dried sample in Example 6.
Figure 35:
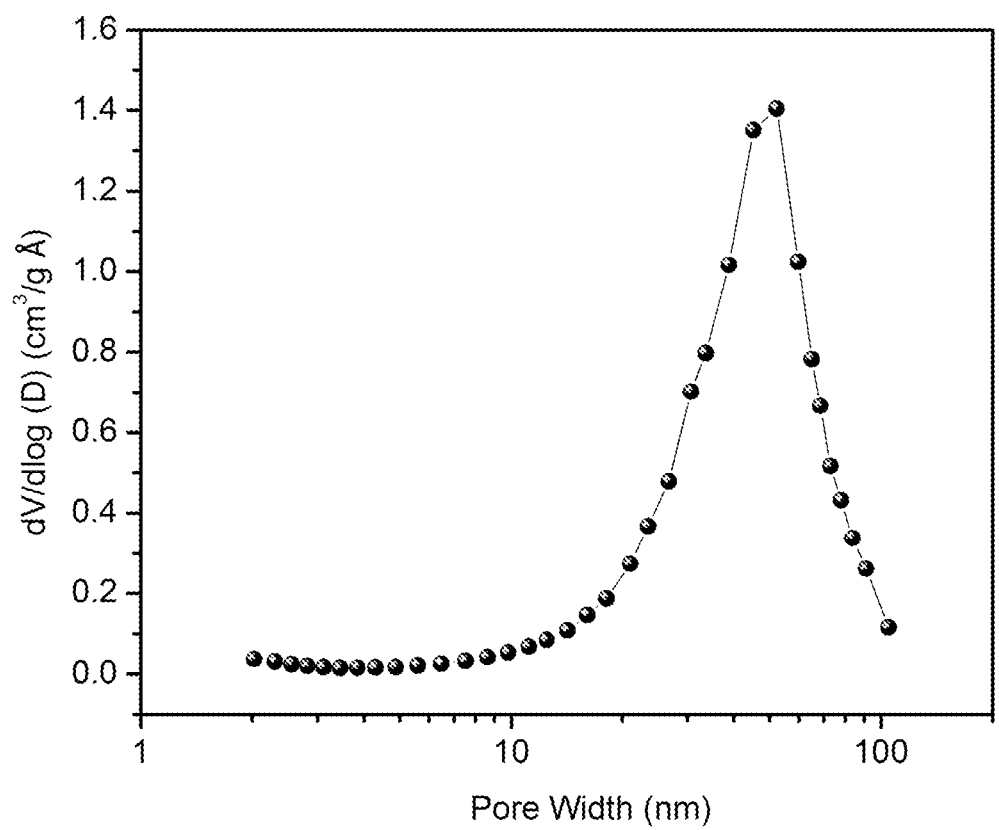
FIG. 35 shows Barrett-Joyner-Halenda (BJH) pore size distributions of the oven-dried sample in Example 6.
Figure 36:
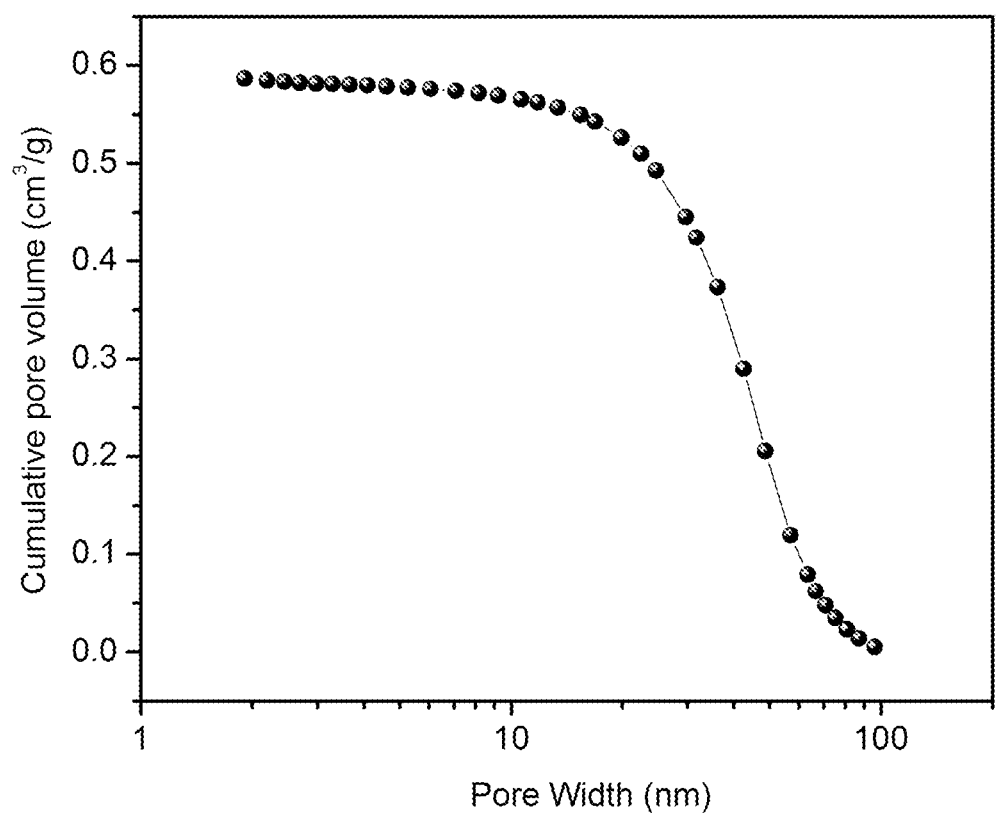
FIG. 36 shows Barrett-Joyner-Halenda (BJH) cumulative pore volume as a function of the pore width of the oven-dried sample in Example 6.

12.74 g of NaOH was dissolved in 12.56 g of deionized water in an ice bath. 22.02 g of sodium silicate (~10.6% $Na_2O$, ~26.5% $SiO_2$) was added subsequently into the NaOH solution and stirred in a water bath with a laboratory mixer at 800 rpm, until the solution became homogeneous by visual inspection. Into the solution, 11.0 g of metakaolin (MetaMax®) was added and stirring was continued at 800 rpm for about 40 min, which yielded a geopolymer resin having approximate nominal Na:Al:Si atomic ratios of 4:1:2. This geopolymer resin was poured into a polypropylene tube, sealed airtight, and heated at 120° C. for 48 hours in a lab oven to give a paste-like geopolymer resin material with a pH value of about 14. The paste was taken out of the container, mixed with a copious amount of deionized water, and subjected to centrifugation at 6000 rpm for 10 min. The resulting clear supernatant solution (pH about 14) was decanted to obtain a wet off-white paste. The mixing with deionized water, centrifugation and decanting steps were repeated until the supernatant liquid attained near neutral pH. The supernatant was decanted to give a wet off-white paste. The dynamic light scattering experiments indicated an average particle size of about 217 nm. FIG. 32 shows the particle size distribution from the dynamic light scattering experiment. It is noted that the paste was thixotropic. After drying at 90° C., the product showed a CAN structure from the powder X-ray diffraction studies (FIG. 33). FIG. 34 shows the $N_2$ sorption isotherms of the oven-dried sample. FIG. 35 shows the corresponding the BJH pore distributions of the oven-dried sample. FIG. 36 shows the corresponding BJH cumulative pore volume as a function of the pore width of the oven-dried sample. The product showed a mesopore volume of 0.59 cm$^3$/g and a surface area of 90.1 m$^2$/g. The calculated micropore volume and surface area were 0.006 cm$^3$/g and 14.5 m$^2$/g, respectively.

Example 7

Figure 37:
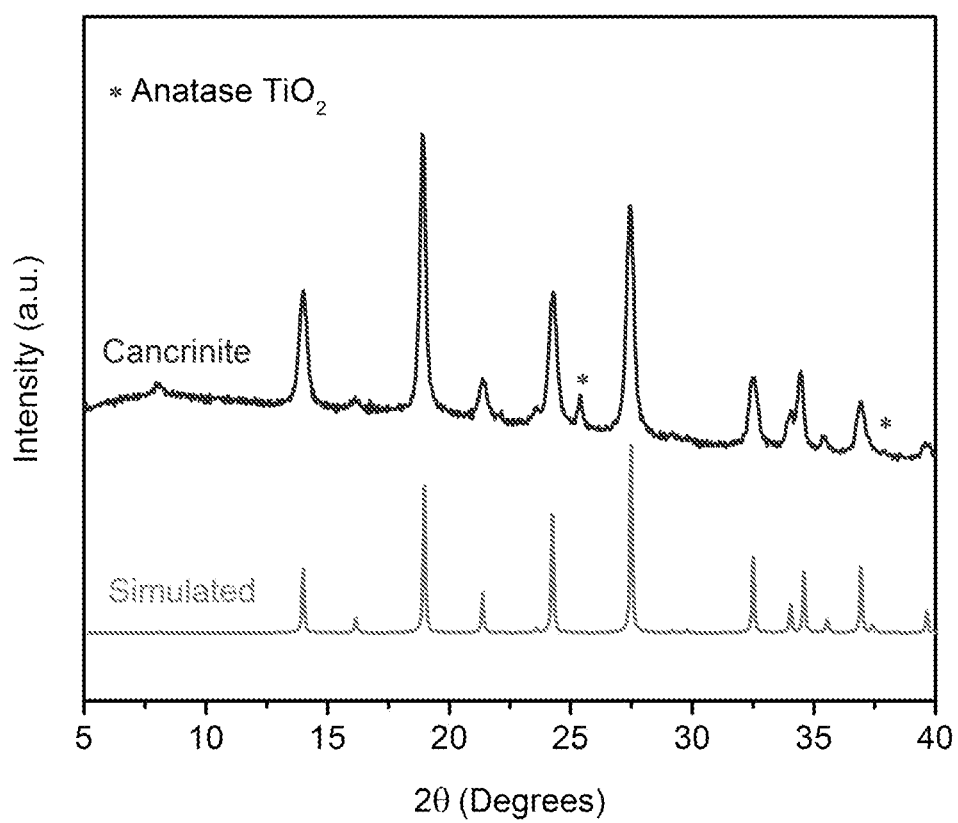
FIG. 37 shows the powder X-ray diffraction pattern of the final product in Example 7.
Figure 38:
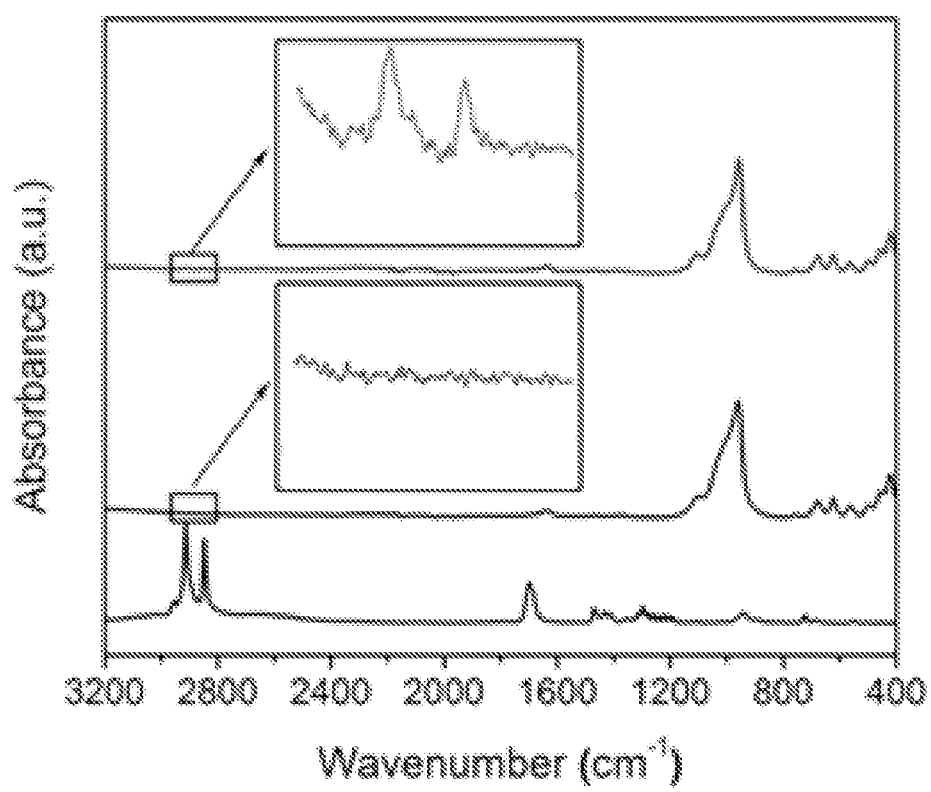
FIG. 38 shows Fourier transform infrared spectrum of the final product in Example 7 (Top) together with those of the product in Example 6 (Middle) and stearic acid (Bottom) for comparison.

Surface functionalization of the product particles in Example 6 was carried out with stearic acid by following the process disclosed by Sakthivel et al. ("Hydrophobic High Surface Area Zeolites Derived from Fly Ash for Oil Spill Remediation" *Environmental Science & Technology* 2013, 47, 5843-5850), which is incorporated herein by reference. 0.16 g of stearic acid was dissolved in 25.0 ml of sodium hydroxide solution (~0.60 M) in 100° C. water bath and an opaque solution was obtained after magnetically stirred for 20 minutes. 1.0 g of the product in Example 6 was subsequently added to the solution. After stirring for another 10 minutes, then the mixture was stirred while slowly cooling to room temperature, which caused precipitation of stearic acid mixed with the product of Example 6. The precipitate was filtered and washed several times with water to remove residual sodium hydroxide. The powder was then dried and placed in a lab oven at 160° C. for 4 h to induce chemical bonding of the stearic acid to the surfaces of the particles. Then the particles were washed several times with hot toluene and room-temperature water to remove excess stearic acid and dried in a lab oven at 90° C. The final product showed a CAN structure from the powder X-ray diffraction studies (FIG. 37). FIG. 38 shows Fourier transform infrared spectrum of the final product (Top) together with those of the product in Example 6 (Middle) and stearic acid (Bottom) for comparison. The presence of absorption peaks in 2800-3000 cm$^{-1}$ in the spectrum of the final product indicates the presence of stearic acid in the final product. The CHN analysis on the final product with triplicates indicated a carbon content of 1.78±0.07 wt %, while the carbon content in the product in Example 6 (before the surface functionalization) was 0.48±0.02 wt %.

A number of embodiments have been described. Nevertheless, it will be understood that various modifications may be made without departing from the spirit and scope of disclosure. Accordingly, other embodiments are within the scope of the following claims.

What is claimed is:

1. A composition comprising:
   a nanostructured aluminosilicate comprising aluminosilicate nanorods, wherein:
   an average width of the aluminosilicate nanorods is between about 5 nm and about 100 nm,
   a majority of the aluminosilicate nanorods have an aspect ratio between about 2 and about 100, and
   wherein the aluminosilicate nanorods comprise unbound aluminosilicate nanorods.

2. The composition of claim 1, wherein at least 50% of the aluminosilicate nanorods have an aspect ratio of at least 5.

3. The composition of claim 1, wherein a majority of the aluminosilicate nanorods are unbound.

4. The composition of claim 1, wherein the aluminosilicate nanorods have a majority of aluminum and silicon atoms in a tetrahedral coordination environment.

5. The composition of claim 1, wherein the aluminosilicate nanorods have a crystallinity with a CAN-type framework structure.

6. The composition of claim 1, wherein the aluminosilicate nanorods comprise a zeolite containing anions in the zeolite cages.

7. The composition of claim 1, wherein a specific external surface area of the nanostructured aluminosilicates is between 50 m$^2$/g and 400 m$^2$/g, wherein the specific external surface area of the nanostructured aluminosilicates is the total specific surface area minus the specific micropore surface area.

8. The composition of claim 1, wherein the aluminosilicate nanorods are formed in a geopolymerization process.

9. The composition of claim 1, wherein the average width of the unbound aluminosilicate nanorods is between about 5 nm and about 60 nm.

10. The composition of claim 9, wherein the average width of the aluminosilicate nanorods is between about 5 nm and about 30 nm.

11. The composition of claim 1, wherein the aluminosilicate nanorods are formed by a process comprising:
    providing a geopolymer resin having a water content between about 70 mol % and about 90 mol %;
    optionally keeping the geopolymer resin at a temperature up to about 60° C. for up to about a week;
    heating the geopolymer resin in a closed container at a temperature between about 120° C. and about 200° C. for up to about a week to yield a first material comprising the nanostructured aluminosilicates comprising the aluminosilicate nanorods;
    optionally treating the first material to produce a second material; and
    optionally concentrating a solid component or collecting a solid product from the first or second material, wherein the solid component or solid product comprises nanostructured aluminosilicates comprising the aluminosilicate nanorods or modified nanostructured aluminosilicates comprising modified aluminosilicate nanorods.

12. The composition of claim 11, wherein treating the first material comprises reducing the concentration of hydroxide of the first material to about 1 M or reducing the pH of the first material from about 14.

13. The composition of claim 11, wherein treating the first material comprises diluting the first material or mixing the first material with an acidic solution.

14. The composition of claim 11, wherein treating the first material comprises combining the first material with a solution of a metal ion that forms an oxide, hydroxide, hydrous oxide, or combination thereof in contact with hydroxide ions.

15. The composition of claim 11, wherein the absolute value of the zeta potential of the nanostructured aluminosilicates or the modified nanostructured aluminosilicates is at least about 30 mV mV in a pH range between about 5 and about 12.

16. A method of forming aluminosilicate nanorods, the method comprising:
    heating a geopolymer resin containing between about 70 mol % and about 90 mol % water in a closed container at a temperature between about 120° C. and about 200° C. for a length of time up to about one week to yield a first material comprising nanostructured aluminosilicates, wherein the nanostructured aluminosilicates comprise unbound aluminosilicate nanorods.

17. The method of claim 16, comprising heating the geopolymer resin at a temperature up to about 60° C. for a length of time up to about one week before heating the geopolymer resin at the temperature between about 120° C. and about 200° C. for the length of time up to about one week.

18. The method of claim 16, comprising treating the first material to yield a second material.

19. The method of claim 18, comprising collecting a solid product from the first or second material.

20. The method of claim 19, wherein collecting the solid product from the first or second material comprises removing water partially or completely from the first or second material.

* * * * *